United States Patent
Yuasa et al.

(10) Patent No.: US 11,934,638 B2
(45) Date of Patent: Mar. 19, 2024

(54) COMMAND DISPLAY CONTROL METHOD, COMPUTER-READABLE MEDIUM AND APPARATUS

(71) Applicant: CELSYS, INC., Tokyo (JP)

(72) Inventors: Shuji Yuasa, Tokyo (JP); Hisakata Omino, Tokyo (JP); Kentaro Yamaguchi, Tokyo (JP)

(73) Assignee: CELSYS, INC., Tokyo (JP)

( * ) Notice: Subject to any disclaimer, the term of this patent is extended or adjusted under 35 U.S.C. 154(b) by 0 days.

(21) Appl. No.: 18/310,534

(22) Filed: May 2, 2023

(65) Prior Publication Data
US 2023/0350545 A1 Nov. 2, 2023

Related U.S. Application Data

(63) Continuation of application No. 17/662,848, filed on May 11, 2022, now Pat. No. 11,681,414, which is a (Continued)

(30) Foreign Application Priority Data

Nov. 12, 2019 (JP) .................. 2019-204763

(51) Int. Cl.
*G06F 3/0482* (2013.01)
(52) U.S. Cl.
CPC ................. *G06F 3/0482* (2013.01)
(58) Field of Classification Search
CPC ................................ G06F 3/048–05
See application file for complete search history.

(56) References Cited

U.S. PATENT DOCUMENTS

| 6,380,957 | B1 | 4/2002 | Banning |
| 7,698,654 | B2 * | 4/2010 | Fong ............... G06F 3/0482 715/810 |

(Continued)

FOREIGN PATENT DOCUMENTS

| CN | 103262010 A | 8/2013 |
| JP | 2004265244 A | 9/2004 |

(Continued)

OTHER PUBLICATIONS

"[SDDmenu2] Simple Drop Down Menu2", [online], [search on Jun. 23, Reiwa 3(2021)], Internet < URL: https://codepen.io/nodelay/pen/tkgxi >, 2018, 8pp.

(Continued)

*Primary Examiner* — Daniel Rodriguez
(74) *Attorney, Agent, or Firm* — HAUPTMAN HAM, LLP

(57) ABSTRACT

A command display method includes a method of displaying a plurality of commands in a computer including a graphical user interface (GUI) for displaying the plurality of commands in a window on a display screen, the plurality of commands having a plurality of layers. The display method includes detecting the vertical or horizontal size of the window; determining the form of a display of each of the plurality of layers in response to the detected size; and controlling a display of the commands in each of the plurality of layers in response to the determined form and an instruction from an operator. At least one of the plurality of layers is controlled to be displayed as a detailed display in an area inside the window. The detailed display is a display of a layer that is at a lower level than the layer whose display form changes.

7 Claims, 23 Drawing Sheets

Related U.S. Application Data continuation of application No. PCT/JP2020/036304, filed on Sep. 25, 2020.

(56) References Cited

U.S. PATENT DOCUMENTS

| | | | | |
|---|---|---|---|---|
| 9,633,080 B2* | 4/2017 | Cai | .................. | G06F 16/288 |
| 2005/0091606 A1* | 4/2005 | Sauermann | ........... | G06F 40/106 |
| | | | | 715/779 |
| 2005/0149551 A1* | 7/2005 | Fong | ................ | G06F 3/0482 |
| | | | | 707/999.102 |
| 2010/0269062 A1* | 10/2010 | Kobylinski | ........... | G06F 9/451 |
| | | | | 715/781 |
| 2012/0185800 A1* | 7/2012 | Hart | .................. | G06F 3/0485 |
| | | | | 715/810 |
| 2012/0227000 A1* | 9/2012 | McCoy | ............... | G06F 3/0482 |
| | | | | 715/762 |
| 2015/0193094 A1* | 7/2015 | Armitage | ........... | G06F 3/04855 |
| | | | | 715/825 |
| 2015/0363049 A1* | 12/2015 | Sadouski | ........... | H04N 21/4858 |
| | | | | 345/173 |
| 2016/0209987 A1 | 7/2016 | Kaufthal et al. | | |
| 2018/0121047 A1* | 5/2018 | Goel | ................. | G06F 3/0485 |
| 2019/0138175 A1* | 5/2019 | Lucca | ................ | G06F 3/0482 |

FOREIGN PATENT DOCUMENTS

| | | |
|---|---|---|
| JP | 200852576 A | 3/2008 |
| JP | 2009301439 A | 12/2009 |
| JP | 2011203868 A | 10/2011 |
| JP | 201410808 A | 1/2014 |
| JP | 2017199080 A | 11/2017 |
| JP | 6333434 B1 | 5/2018 |
| WO | 2012044770 A2 | 4/2012 |

OTHER PUBLICATIONS

[Summary] Menus that can be used with free-progressive design 3 selections, [search on Jun. 23, 2015], Internet < URL:https://mobilelab.domore.co.jp/smartphone/180201 >, Feb. 1, 2018, 9pp.

* cited by examiner

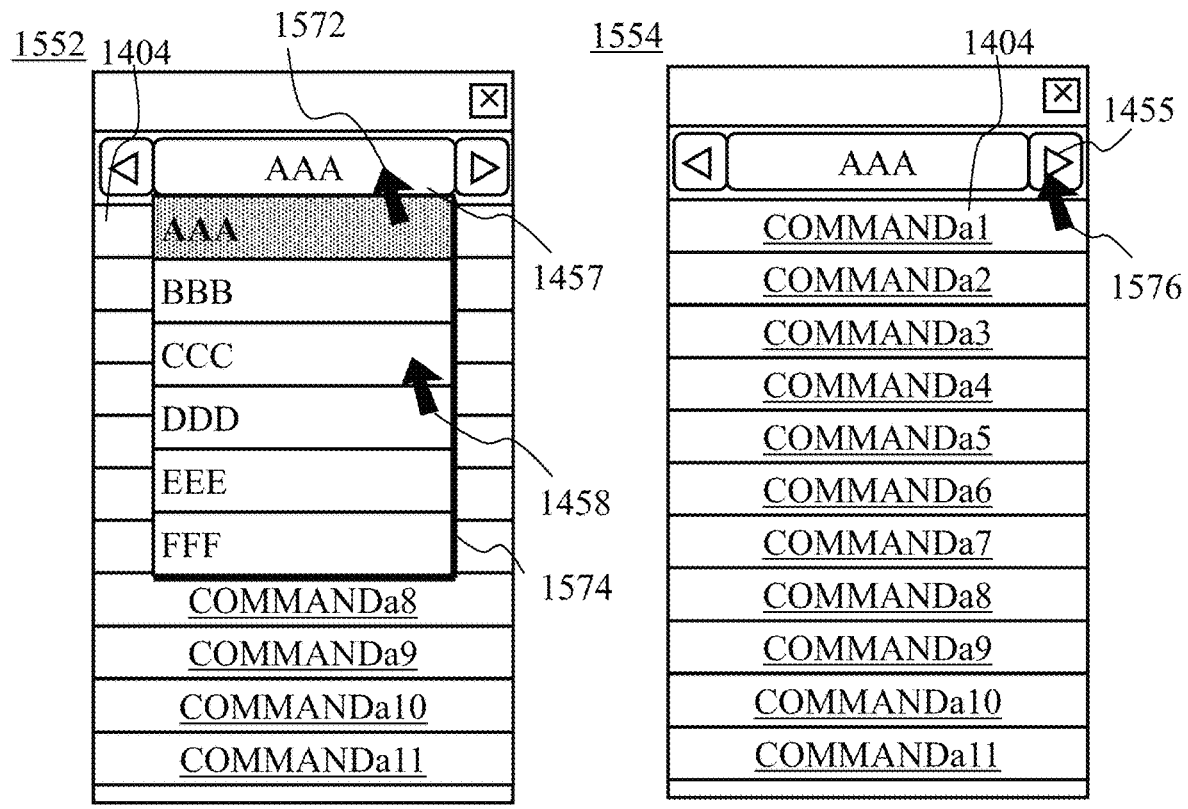

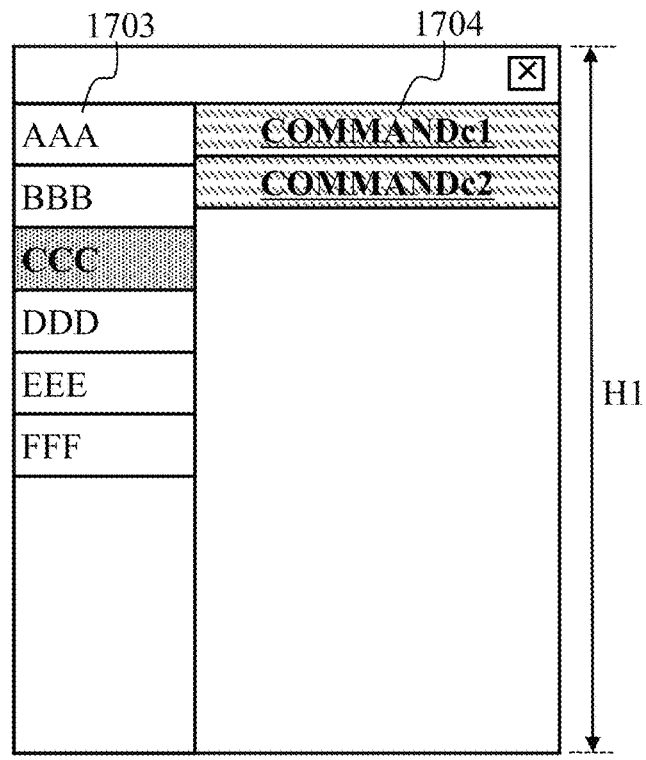
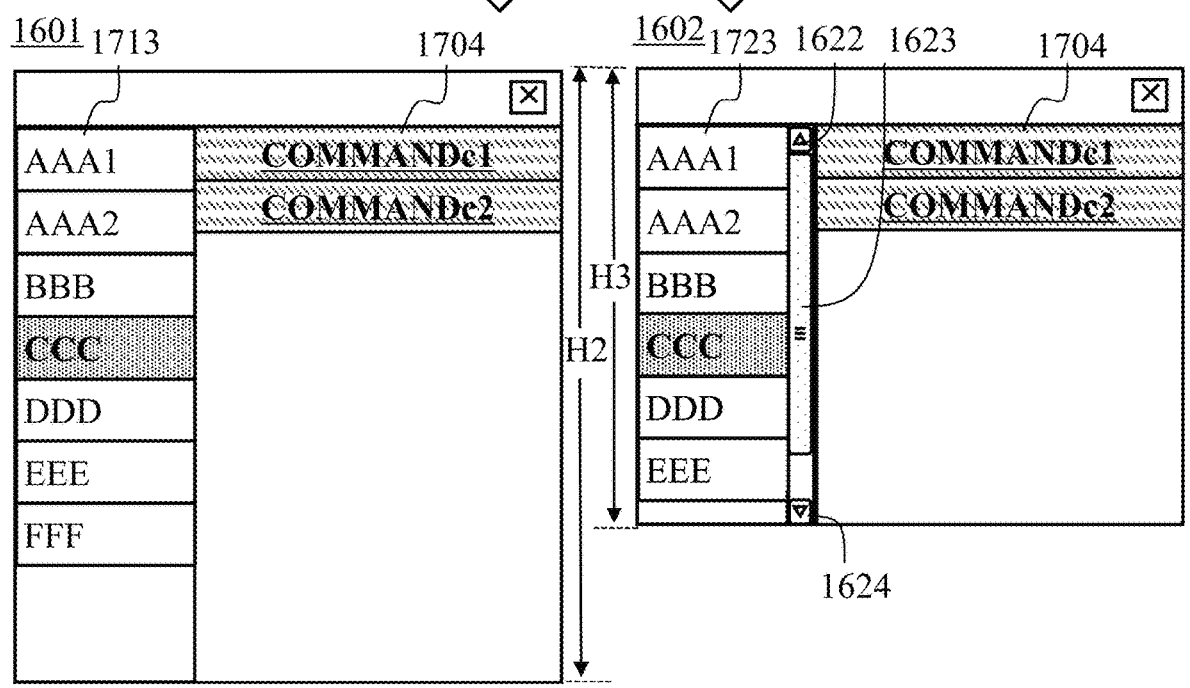
FIG. 7A
FIG. 7B  FIG. 7C

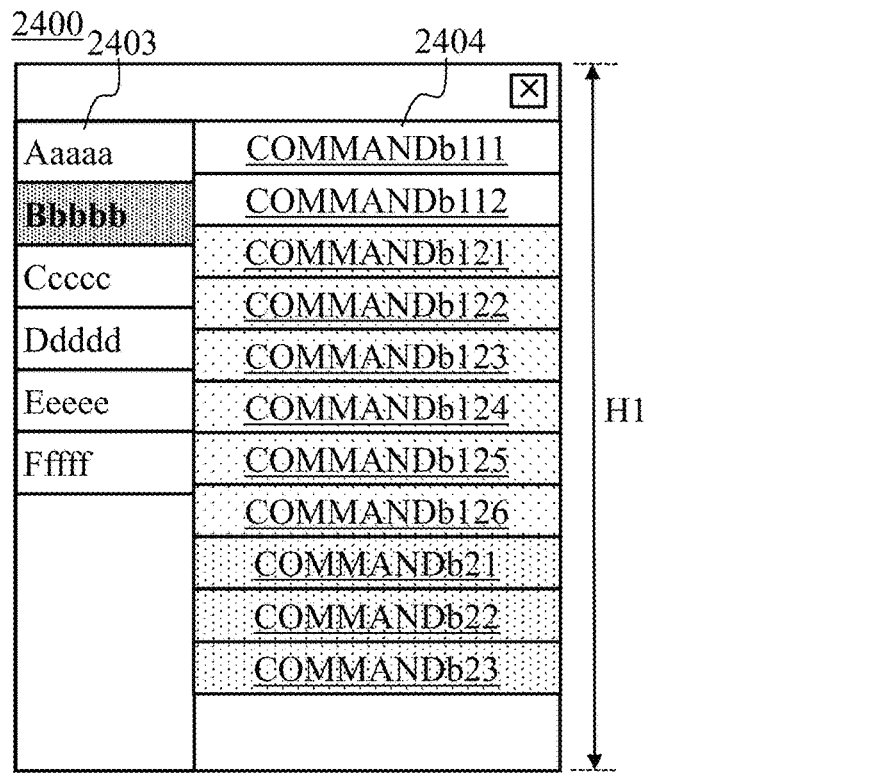
FIG. 14A
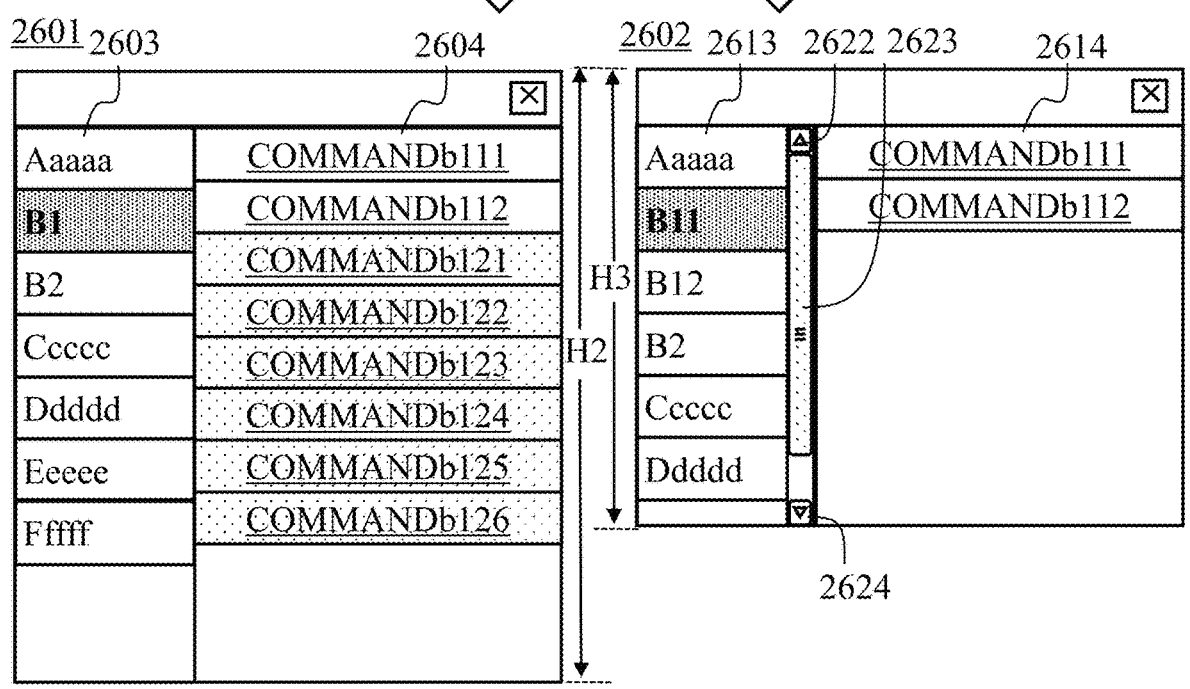
FIG. 14B
FIG. 14C

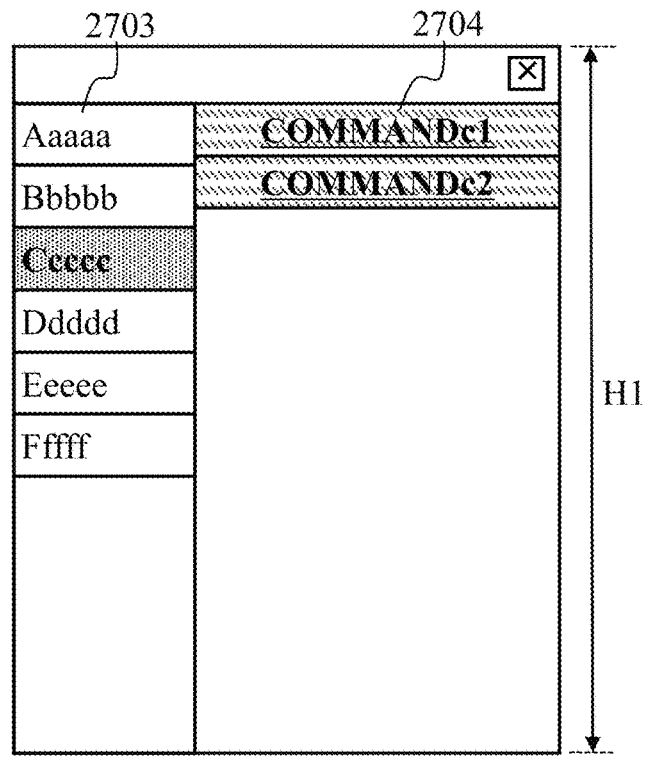
FIG. 15A
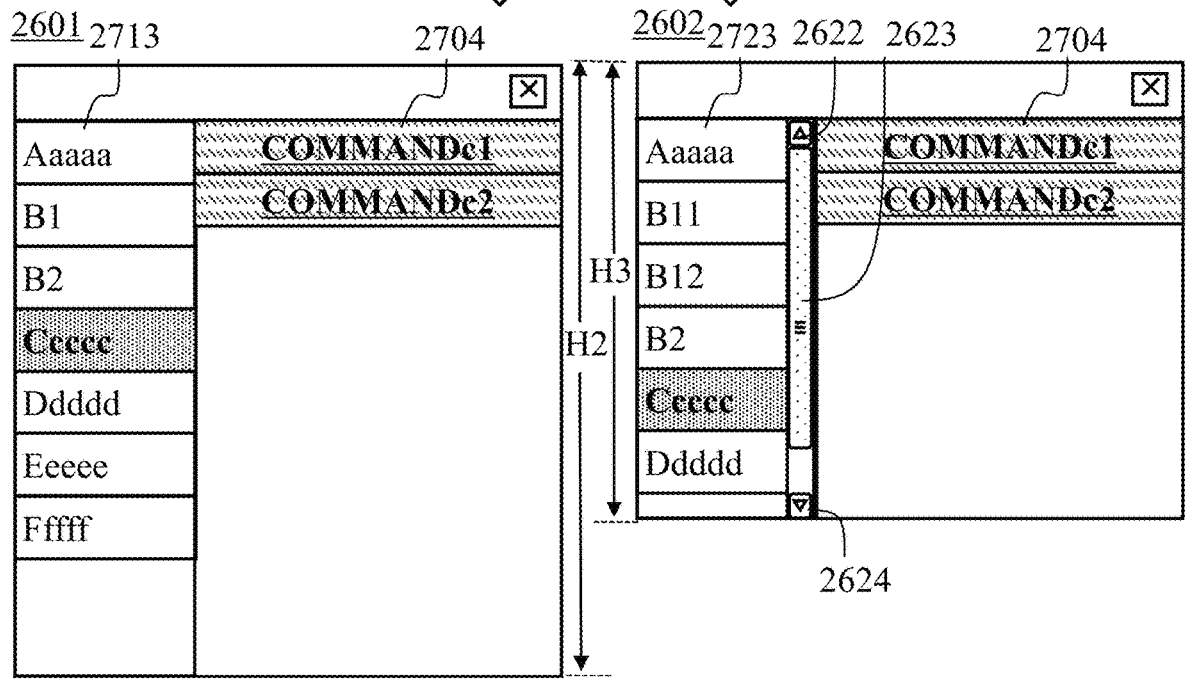
FIG. 15B
FIG. 15C

COMMAND DISPLAY CONTROL METHOD, COMPUTER-READABLE MEDIUM AND APPARATUS

CROSS REFERENCE OF RELATED APPLICATION

This application is a continuation application of U.S. patent application Ser. No. 17/662,848, filed on May 11, 2022, which is a continuation of International Application Serial No. PCT/JP2020/036304, filed Sep. 25, 2020, which claims priority to Japanese Patent Application No. 2019-204763, filed Nov. 12, 2019. The contents of these applications are incorporated herein by reference in their entirety.

BACKGROUND

Technical Field

The present disclosure relates to a command display control method, a non-transitory computer-readable medium storing a command display control program, and an apparatus therefor.

Background Art

Heretofore, graphical user interfaces (GUIs) have been used as visual interfaces for computer applications to receive instructions or the like from an operator and for displaying the state of computer applications.

These GUIs include icons, buttons, and selection menus for specifying various commands and entering values, fields for entering parameters or the like, and so on.

For example, word processing applications, image forming applications, numerical applications using spreadsheets or the like, and paint tool applications such as CLIP STUDIO PAINT (registered trademark) based on the applicant's technique are equipped with GUIs that enable the user to issue desired commands, enter characters, numerical values, and objects, and select various parameter values.

Various computer programs are becoming more sophisticated in functionality, and the number of GUI elements for them is large. Moreover, since such a set of GUI elements is visual information, they need to have a certain size inside their display area. For this reason, a GUI display area is necessary.

However, if the GUI display area is large, there is a problem that there is not enough space for other work areas and the like. Therefore, GUIs themselves are required to function sufficiently as GUIs even in a small area. In order to respond to these demands, ideas have been required that enable many GUI elements to be displayed to the user in an easy-to-understand manner and to be easily selected by the user.

For example, the following techniques exist for the purpose of improving the usability of GUIs.

There is a technique in which one of pieces of hierarchical item information displayed is focused, and if a main control unit determines that a focus movement speed for the hierarchical item information is smaller than a predetermined reference value that has been set in advance, first control means of a liquid crystal display controls display means so as to simultaneously display first-layer item information and second-layer item information (see Japanese Patent Application Publication No. 2008-52576, for example).

There is also a technique in which a first-layer display is displayed on a display device as an object that can be selected and designated with an input device, and if the displayed first-layer display is selected and designated with an input device, not only the selected intermediate-layer display but the last-layer display corresponding thereto are arranged in a single screen along with the first-layer display, so as to simplify a procedure of presenting the last-layer display (see Japanese Patent Application Publication No. 2004-265244, for example).

Also, Word (registered trademark), which is word processing software marketed by Microsoft (registered trademark) Corporation, is equipped with what is called the ribbon, which is a set of toolbars. Among the tools with a hierarchical structure displayed in the ribbon, the tools in a high-level layer are mainly displayed when the application window is small, and the tools in the lower-level layers are also displayed when the window is large. Also, the ribbon can be customized in advance (see Microsoft Word for Office 365 program by Microsoft Corporation as of Oct. 28, 2019, for example).

In the above techniques, for example, when a GUI is selected to display commands or the like having a hierarchical structure, the display of the GUI may hide other displays under it, which is not user friendly in some cases. Also, when the size of the window is changed while a desired hierarchical part of a GUI is displayed, the size of the GUI area is also changed, and as a result, the GUI of the desired layer displayed sometimes disappears from the display screen. This leads to poor user friendliness in the selection of a GUI, such as forcing the user to repeat an operation of displaying the GUI of the desired layer again.

Also, in the case of a GUI in which a hierarchical display is followed to display a desired layer, then, when the hierarchical display is followed with a mouse cursor or the like, the currently displayed hierarchical display may disappear from the screen if another part is clicked with the mouse cursor or the mouse cursor is moved to another area. This is not user friendly because in order to display a desired hierarchical display, the operator is forced to follow the hierarchical display in the GUI and display the desired layer.

SUMMARY

It is an object of the technique disclosed herein is to display a user-friendly GUI suitable for the size of its display area even when an operation of changing the display area of the GUI itself or the like is performed due to various reasons.

The technique disclosed herein provides a command display method being a method of displaying a plurality of commands in a computer including a graphical user interface for displaying the plurality of commands in a window on a display screen, the plurality of commands having a plurality of layers, the command display method comprising: detecting a vertical or horizontal size of the window; determining a form of a display of each of the plurality of layers in response to the detected size; and controlling a display of the commands in each of the plurality of layers in response to the determined form and an instruction from an operator such that at least one of the plurality of layers is controlled to be displayed as a detailed display in an area inside the window, the detailed display is a display of a layer that is at a lower level among the plurality of layers than at least one layer whose display form changes, and the detailed display is displayed before and after a change in the display form.

The technique disclosed herein also provides a non-transitory computer-readable medium storing a command display program and a command display apparatus.

With the technique disclosed herein, it is possible to display a user-friendly GUI suitable for the size of its display area even when an operation of changing the display area of the GUI itself or the like is performed due to various reasons.

BRIEF DESCRIPTION OF DRAWINGS

FIGS. 5A to 5C are diagrams illustrating an example of the behavior of the GUI when the width of the window in embodiment 1 is reduced.

FIGS. 7A to 7C are diagrams illustrating a display example of the hierarchical structure of command categories in a case where the height of the window in embodiment 1 is changed.

FIGS. 14A to 14C are diagrams illustrating an example of a case where the height of the window in embodiment 2 is changed.

FIGS. 15A to 15C are diagrams illustrating a display example of the hierarchical structure of command categories in a case where the height of the window in embodiment 2 is changed.

DETAILED DESCRIPTION

Embodiments will be described below with reference to the drawings. Note that the steps in methods and programs can be executed in an interchangeable order as long as there is no contradiction. Also, each step may be executed in parallel with another step. Moreover, not all steps are essential, and some of the steps may be absent or skipped as long as there is no contradiction. Further, each step may be executed by an operating system or hardware. Furthermore, the programs can be stored in a non-transitory tangible medium and distributed.

In the embodiments to be discussed below, a plurality of commands are classified by a hierarchical structure. A command in this description means an instruction designated by an operator for an application program that is being executed. Examples of the commands include selection or entry of a character, a numerical value, an object, or the like, selection or entry of various parameter values or the like, issuing of an instruction to execute a particular function, and so on. The term "command category" in the embodiments means a set of commands. Among commands in a hierarchical structure, those belonging to the lowest level in the hierarchical command structure will simply be referred to as commands, and those at the levels other than the lowest level will be referred to as command categories. A command category, which is a set of commands, is also a type of command. Needless to say, a "category" may be a word having the meaning of a common concept or the like that can be easily associated with the commands or the command categories below it, or may be a numerical character, a symbol, or a character string that has no meaning, such as a number. Also, in this description, a higher-level structure and a lower-level structure in a hierarchical structure will be indicated by the terms "higher-level concept" and "lower-level concept", respectively.

Also, a term "command set" will be used for the highest concept in a hierarchical structure. A plurality of command sets can be present, but one command set will be described in embodiments 1 and 2 below in order to facilitate understanding of the description. A command set is a command category as well.

Also, the embodiments are not exclusive. Part of an embodiment can be incorporated in the other embodiment as long as there is no contradiction.

Figure 1:
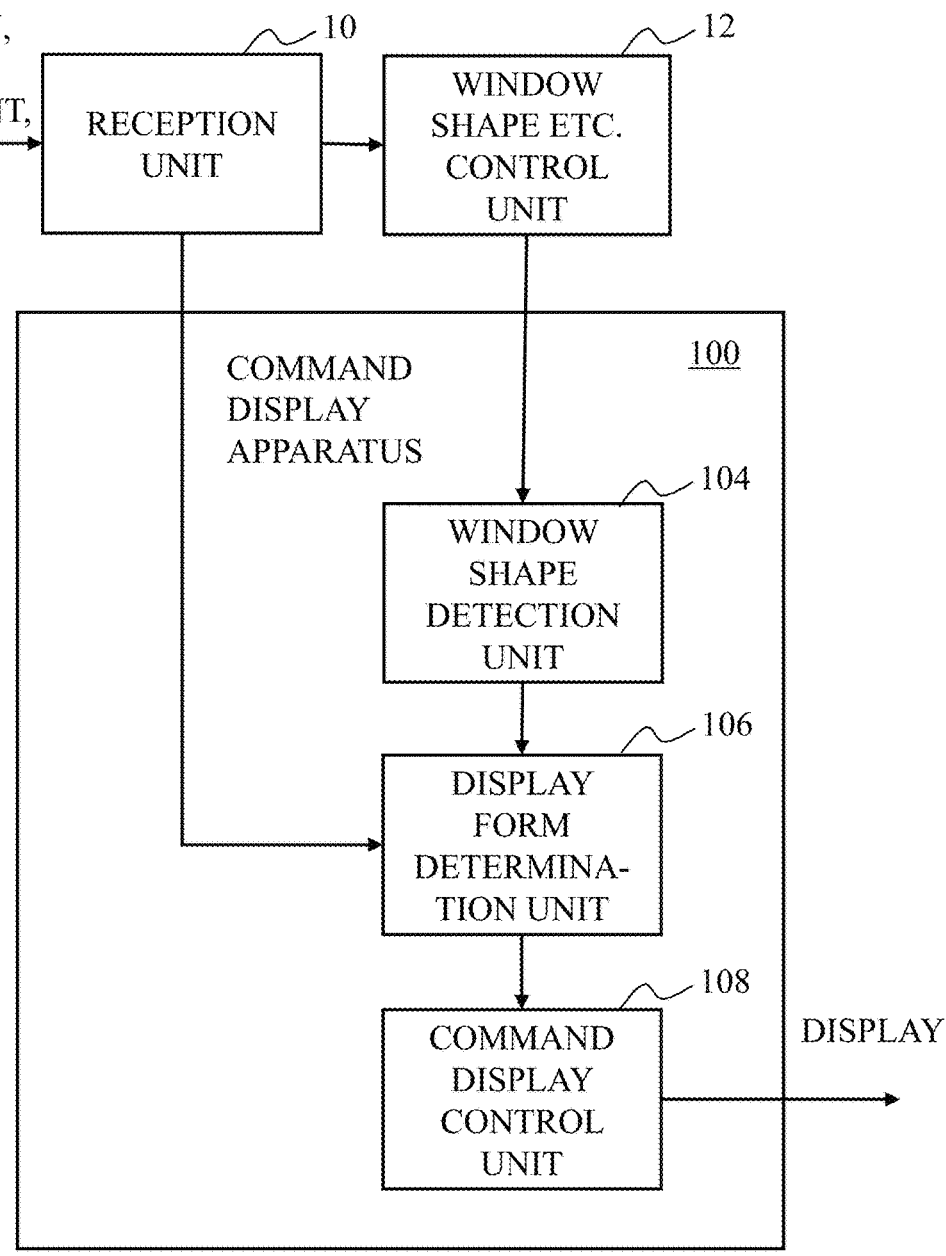
FIG. 1 is a block diagram of an embodiment.

FIG. 1 is a block diagram of an embodiment. In FIG. 1, the configuration of the embodiment is represented by a command display apparatus 100. A reception unit 10 that receives operation instructions from an operator and changes in the environment of a display apparatus or the like and a window shape etc. control unit 12 provide suitable information to the command display apparatus 100. Note that FIG. 1 illustrates only the functions of components necessary to describe the embodiment and accompanying components. It is therefore needless to say that the command display apparatus of the embodiment operates also in cooperation with other functional components not illustrated.

The window shape etc. control unit 12 determines the shape of a window and controls a display unit according to, for example, an operation instruction or a change in the environment of the display apparatus or the like received by the reception unit 10.

The command display apparatus 100 representing the embodiment has a window shape detection unit 104, a display form determination unit 106, and a command display control unit 108.

The window shape detection unit 104 detects the shape of the window by obtaining information on the window from the window shape etc. control unit 12. In the embodiments to be discussed below, various commands can be displayed in the window.

The display form determination unit 106 determines the display form of the window from information on the shape of the window from the window shape detection unit 104 and information such as the operator's operation instruction from the reception unit 10. Specific examples of the display form of the window will be described later.

The command display control unit 108 controls the display of commands by means of functions in the window. The output of the command display control unit 108 is used to display commands.

The above is an outline of the operation of the command display apparatus 100. Note that specific operation of the above functions is similar to that in the description of procedures in flowcharts to be given later.

<Hardware Configuration>

Figure 2:
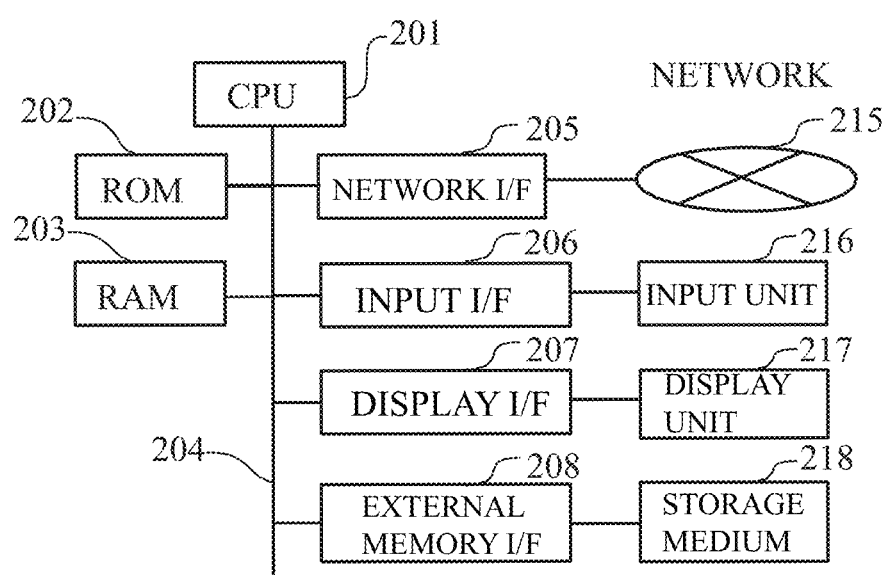
FIG. 2 is a diagram illustrating a hardware configuration of an embodiment.

FIG. 2 is a diagram illustrating a hardware configuration of an embodiment. The hardware configuration of the embodiment has a CPU 201, a ROM 202 storing a program of the embodiment and data, a RAM 203, a network interface 205, an input interface 206, a display interface 207, and an external memory interface 208. These pieces of hardware are connected to each other by a bus 204.

The network interface 205 is connected to a network 215. The network 215 is a wired LAN, a wireless LAN, the Internet, a telephone network, or the like. An input unit 216 is connected to the input interface 206. A display unit 217 is connected to the display interface 207. The display unit 217 may be configured of a plurality of display apparatuses. A storage medium 218 is connected to the external memory interface 208. The storage medium 218 may be a RAM, a ROM, a CD-ROM, a DVD-ROM, a hard disk drive, a memory card, a USB memory, or the like.

The programs and methods that implement the embodiments to be described below can be executed by a computer including the hardware configuration illustrated in FIG. 2. In other words, the procedure in each embodiment may be implemented as a program and method to be executed by a computer. Part or entirety of the program or method of the embodiment may be executed by the operating system. Also, part of the program or method may be implemented by hardware. The program may be stored in the storage medium 218, the ROM 202, or the RAM 203.

Each embodiment can be implemented as a hardware apparatus.

It is needless to say that the embodiments to be disclosed in this description do not limit the invention described in the claims but are to be construed as examples.

In the following description of embodiments 1 and 2, in order to aid understanding, the description will be given firstly by presenting a specific example of the display form of the window. Thereafter, a common processing flow for embodiments 1 and 2 will be described.

Embodiment 1

Figure 3:
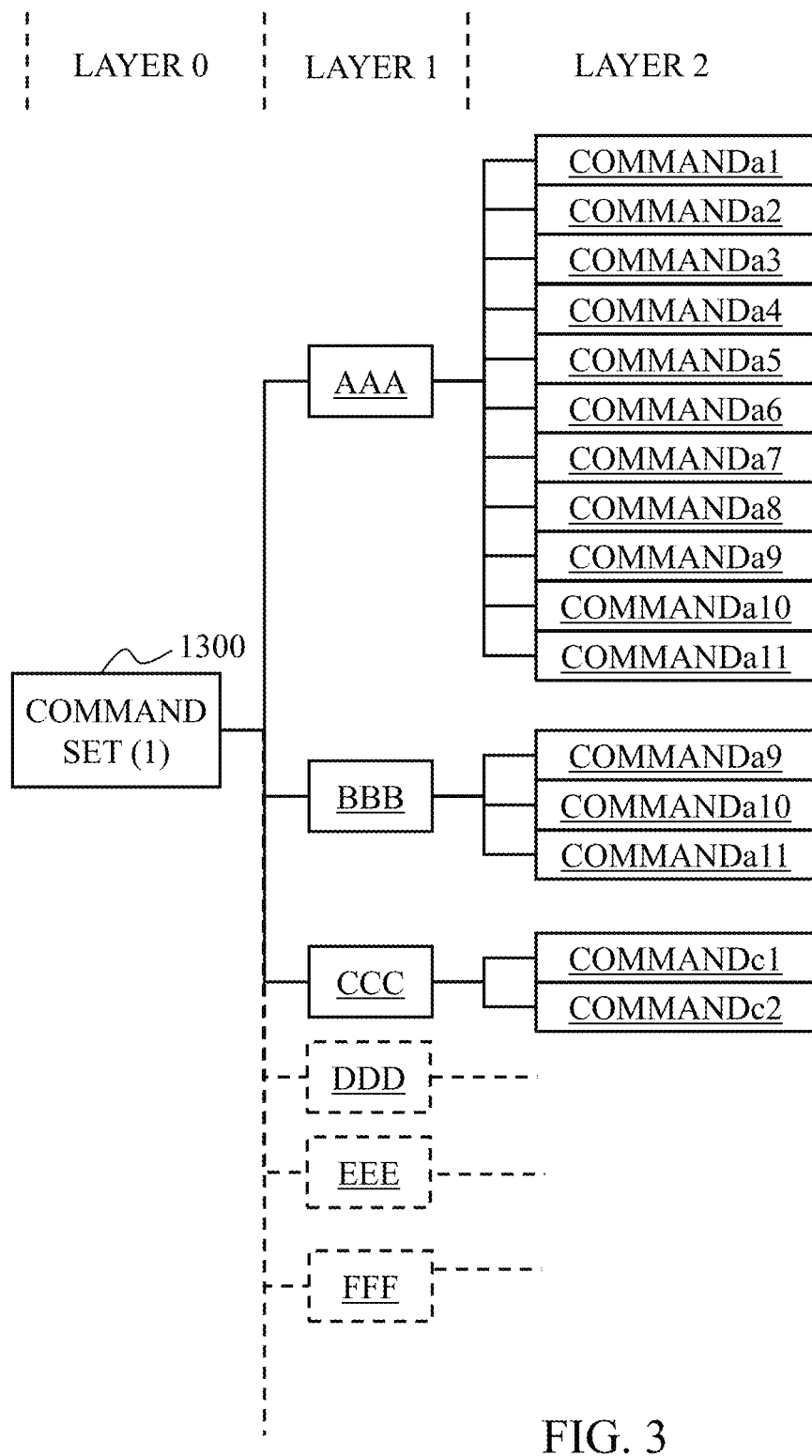
FIG. 3 is a diagram illustrating an example of the hierarchical structure of commands used in embodiment 1.

FIG. 3 is a diagram illustrating an example of the hierarchical structure of a command set (1) 1300 used in embodiment 1. The commands in the command set (1) 1300 can be classified by common concepts, character strings, or the like having a hierarchical structure. This hierarchical structure has three layers, for example. A layer 0 and a layer 1 represent command categories. Specific commands are listed in a lowest-level layer 2. A layer assigned a smaller number represents command categories of a higher-level concept. Note that the hierarchical structure in FIG. 3 is an example. A specific application program forms a unique hierarchical structure. In FIG. 3, command categories AAA, BBB, and CCC in the layer 1 are specifically illustrated down to the lower-level layer. It is to be noted that illustration of the hierarchical structure of command categories DDD, EEE, and FFF depicted by the dotted lines is omitted for the purpose of making the following description simple and easy to understand.

Figure 4A:
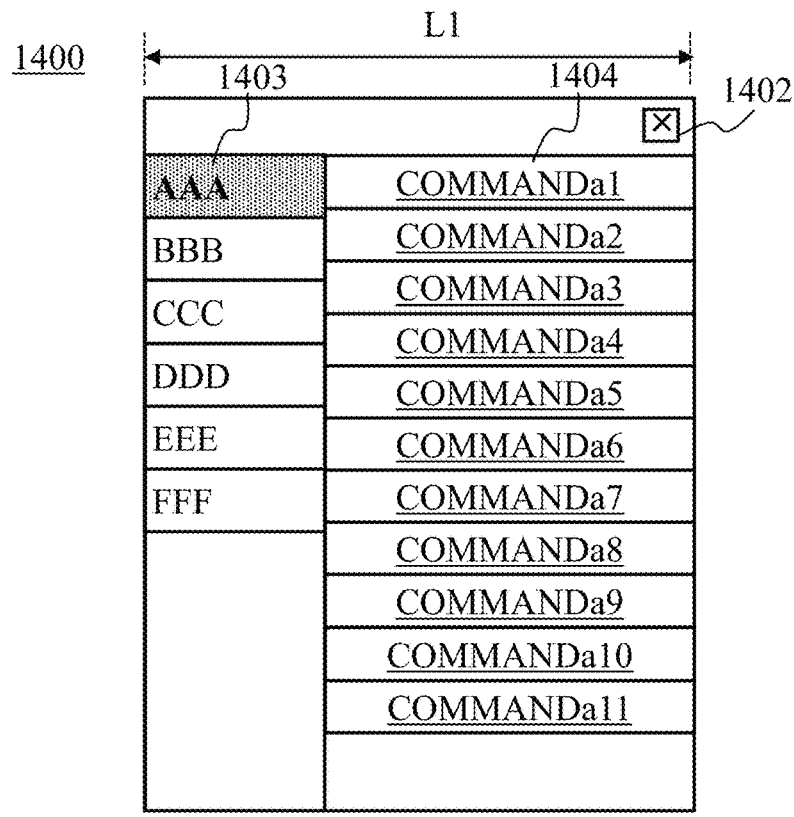
FIGS. 4A and 4B are diagrams illustrating an example of a case where the width of a window in embodiment 1 is changed.
Figure 4B:
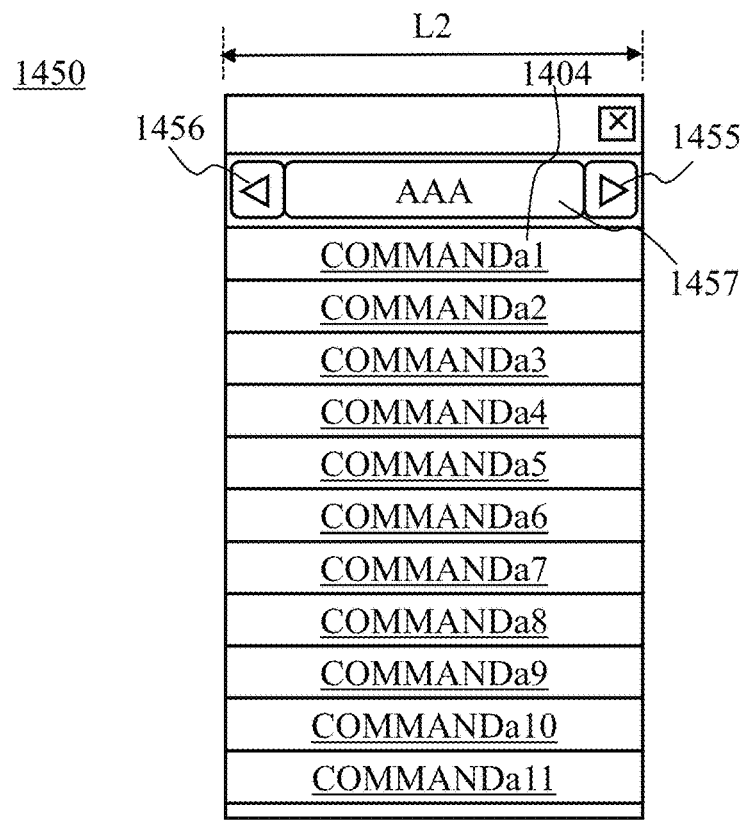

FIGS. 4A and 4B are diagrams illustrating an example of a case where the width of the window in embodiment 1 is changed. The horizontal width of a window 1400 in FIG. 4A is L1. In the window 1400, the layer-1 level command categories are listed and displayed in a menu 1403. The command category AAA in the menu 1403 is highlighted. Note that the arrangement of the menus and lists in this description is not limited to a vertical arrangement, but may be a horizontal arrangement, a vertical-horizontal matrix arrangement, an arrangement of icon images, or the like. Further, the layer-2 level commands belonging to the command category AAA are listed in a command list 1404. By operating one of the commands displayed in the command list 1404 with a pointing device, such as a mouse or a stylus pen, the operator can issue a desired command to the program. Note that the commands are not limited to commands that can be designated by being clicked, but may be any commands such as commands whose values can be set with a slide bar or the like or commands whose ON/OFF can be set with a toggle. Note that a symbol 1402 is a button capable of issuing an instruction to close the window 1400.

A window 1450 in FIG. 4B represents a window obtained by reducing the width L1 of the window 1400 to L2. In the case where the width of the window 1450 is thus reduced to L2, it is difficult to display both the command category menu 1403 and the command list 1404 displayed in the window 1400. Equally reducing the widths of both the menu 1403 and the command list 1404 makes it difficult to display both. Thus, displaying both the menu 1403 and the command list 1404 with reduced display widths will result in a GUI that is difficult to understand for the user. For this reason, the display of the command category menu 1403 is removed in the window 1450. Instead, a pull-down menu button 1457 which displays a pull-down menu or switch keys (1455, 1456) which, by being clicked, enables a command category display to be selected in a round-robin fashion may be displayed. In embodiment 1, these display forms and similar display forms will be collectively referred to as "a menu in a form in which a plurality of states switch from one to another in turn".

In FIG. 4B, it is desirable that the command list 1404 of the lowest-level layer 2 be displayed as is although the window 1450 is narrowed to the width L2. Displaying the command list 1404 of the lowest-level layer 2 in this manner enables the operator to perform a command operation more easily. By preventing the display of the command list 1404 from disappearing, it is possible to avoid forcing the operator to perform a troublesome operation of displaying the layer-2 level commands again.

FIGS. 5A to 5C are diagrams illustrating an example of the behavior of the GUI when the width of the window in embodiment 1 is reduced. A window 1552 in FIG. 5A indicates a state where the pull-down menu button 1457 has been clicked with a mouse cursor 1572. The layer-1 level command categories are displayed in a pull-down menu 1574. The command category AAA is highlighted since the layer-2 level commands under the command category AAA are displayed in the window 1552. Assume that the command category CCC is clicked with a mouse cursor 1458 in this state.

FIG. 5C illustrates the state of a window 1556 immediately after that. A list 1504 of the layer-2 level commands under the command category CCC is displayed in the window 1556. By displaying the pull-down menu again in the window 1556 in FIG. 5C and selecting the command category AAA, the window 1556 is brought back the state of the window 1552 in FIG. 5A.

FIG. 5B illustrates the state of a window 1554 immediately before the switch key 1455 is clicked with a mouse cursor 1576. Clicking the switch key 1455 twice, for example, with the mouse cursor 1576 displays the command category CCC in a pull-down menu button 1557, so that the window transitions to the state of the window 1556 in FIG. 5C. Clicking the switch key 1456 in the window 1556 in FIG. 5C twice brings the window back to the state of the window 1554 in FIG. 5B.

As described above, in FIGS. 5A to 5C, the width of the window 1552 has been reduced, but the operator can easily display desired layer-2 level commands by using the pull-down menu 1574 or the switch key 1455 or 1456.

Figures 6A, 6B:
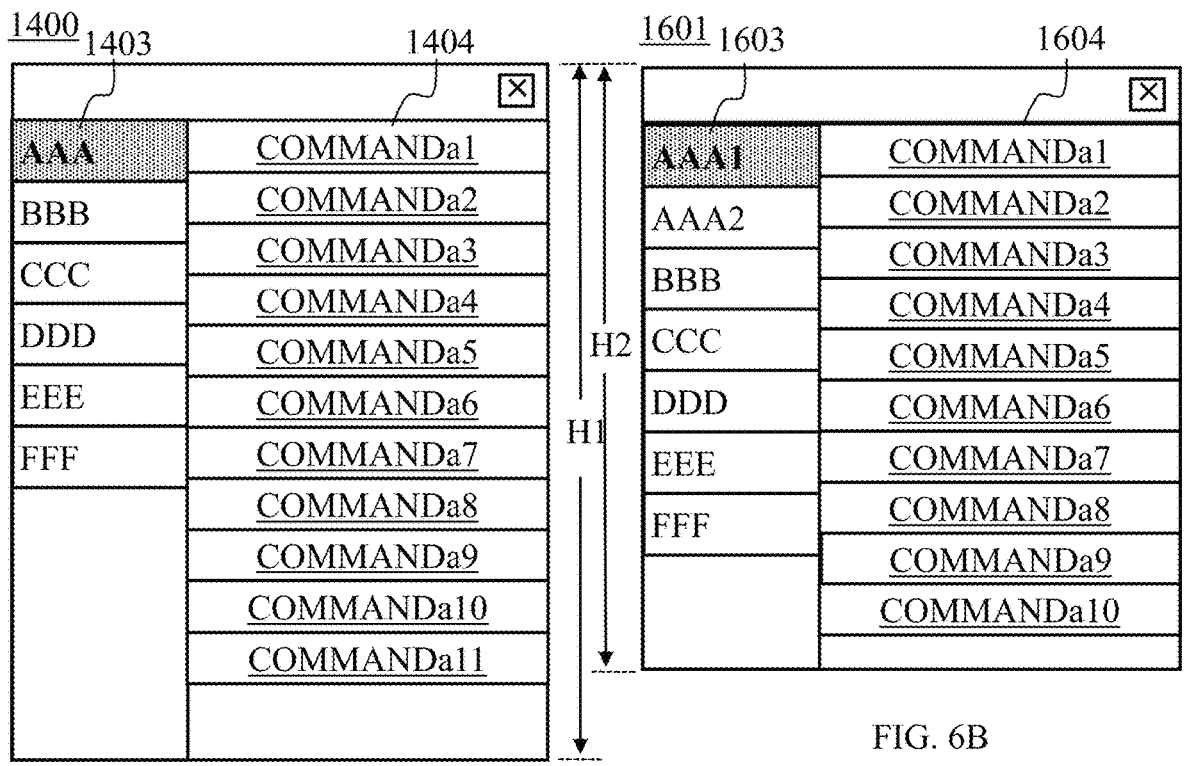
FIGS. 6A to 6D are diagrams illustrating an example of a case where the height of the window in embodiment 1 is changed.

FIGS. 6A to 6D are diagrams illustrating an example of a case where the height of the window in embodiment 1 is changed. In FIG. 6A, the height of the window 1400 is H1. In FIG. 6B, the height of a window 1601 has been reduced to H2. This results in a state where not all of the layer-2 commands under the command category AAA can be displayed.

In this case, in the display of a menu 1603, a sub command category AAA1 and a sub command category AAA2 obtained by dividing the display of the command category AAA may be displayed (hereinafter divided command categories (e.g., AAA1 and AAA2) will be referred to as "sub command categories"). Further, in a command list 1604, the layer-2 level commands belonging to the sub command category AAA1 are displayed. Among the layer-2 level commands belonging to the command category AAA, a command all, whose display has been removed, is caused to belong to the sub command category AAA2. In this case, in the menu 1603, the sub command category AAA1 may be highlighted to notify the operator that the display of the command list 1604 indicates the layer-2 commands under the sub command category AAA1. Also, for example, the command category CCC or the like may be divided into sub command categories at the same time as when the display of the command category AAA is divided into sub command categories, or they may be divided separately.

In the display of the menu 1603, the sub command categories AAA1 and AAA2 obtained by dividing the display of the command category AAA as described above may be displayed as the layer 2 as sub command categories.

Figures 6C, 6D:
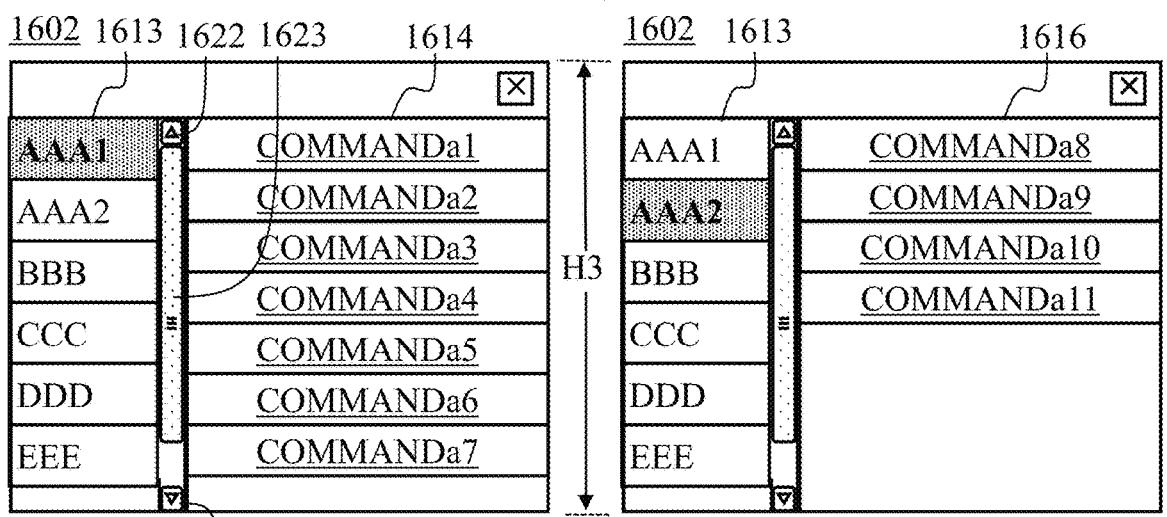

In FIG. 6C, the height of a window 1602 has been further reduced to H3. Thus, a smaller number of layer-2 level commands under the command category AAA may be displayed.

As illustrated in FIG. 6D, instead of the sub command category AAA1, the sub command category AAA2 may be highlighted and the layer-2 level commands under the sub command category AAA2 may be displayed in a command list 1616. The sub command category among the sub command category AAA1 and the sub command category AAA2 whose commands are to be displayed with priority may be determined in advance. Alternatively, the commands belonging to the sub command category AAA2 may be displayed in the command list 1616 when the user selects the sub command category AAA2 with a pointing device or the like while the sub command category AAA1 is selected.

Meanwhile, the command category AAA in the layer 1 may be divided into the sub command category AAA1 and the sub command category AAA2 such that the part of the command list that fits within the window is assigned to the sub command category AAA1 and the rest is assigned to the sub command category AAA2.

Alternatively, that the command category AAA in the layer 1 is to be divided into the sub command category AAA1 and the sub command category AAA2 may be stored in a memory in advance. When other command categories are also to be divided into and displayed as sub command categories, that they are to be divided into sub command categories may be stored in the memory in advance, as in the above.

Note that for each command category that is not to be divided into sub command categories, it is desirable to take a measure to prevent the commands belonging to the command category from failing to be displayed when the vertical length of the window is reduced. In an example of this measure, the minimum value of the vertical length of the window may be set in advance such that all commands belonging to the command category that is not to be divided can be displayed. Alternatively, if some commands cannot be displayed, a slide bar similar to a slide bar (1622, 1623, 1624) may be displayed in a command list 1614 or the like.

As described above, when the vertical length of the window is reduced such that the command list cannot display all commands, the command category displayed in the menu is divided into sub command categories as appropriate. In this way, it is possible to reduce the number of lowest-layer (layer-2) level commands displayed. The operator can view the menu in which sub command categories are displayed according to the size of the window. Also, although the window is smaller, the operator can select an appropriate command category (or sub command category) such that no command is hidden and becomes invisible and desired commands are displayed. Thus, a command display that is easy to understand and easy to select for the operator is possible.

Note that the size of the window can be defined by pixel counts, dimensions in the display screen, or the like.

Meanwhile, FIG. 6C illustrates an example where a menu 1613 has become unable to display all command categories and the number of displayable commands under the sub command category AAA1 has decreased. In this case, the slide bar (1622, 1623, 1624) may be displayed in the menu to enable the operator to issue an instruction to display a desired part of the menu. Moreover, commands a8 to a11 which can no longer be displayed under the sub command category AAA1 may be caused to belong to the sub command category AAA2.

FIG. 6D illustrates an example where the sub command category AAA2 has been selected by the operator. The commands a8 to a11 now belonging to the sub command category AAA2 are displayed in the command list 1616.

Note that if the height of the window 1602 is increased from the state of FIG. 6C, the display form can be brought back to that of the window 1601 in FIG. 6B or the window 1400 in FIG. 6A according to this height.

In the above-described manner, an appropriate number of lowest-level layer (layer-2) commands can be displayed in an easily operable fashion according to the height of the window.

FIGS. 7A to 7C are diagrams illustrating a display example of the hierarchical structure of commands in a case where the height of the window in embodiment 1 is changed.

FIGS. 7A to 7C illustrate an example of a case where a different command category, with respect to the height of the window described with reference to FIG. 6A to 6D, is selected.

In FIG. 7A, the command category CCC is selected and highlighted in a menu 1703. In this case, the layer-2 level commands belonging to the command category CCC are displayed in a command list 1704.

In the case of the window 1601 in FIG. 7B, the layer-2 level commands under the command category CCC are displayed in the command list 1704 with plenty of free room. For the command category AAA, however, the height of the command list 1704 is small, as described with reference to FIGS. 6A to 6D. Thus, in a menu 1713, the sub command category AAA1 and the sub command category AAA2 divided from the command category AAA may be displayed.

The same applies to FIG. 7C. Also, in a menu 1723, a slide bar similar to the slide bar (1622, 1623, 1624) may be displayed, as illustrated in FIG. 7C.

Figure 8A:
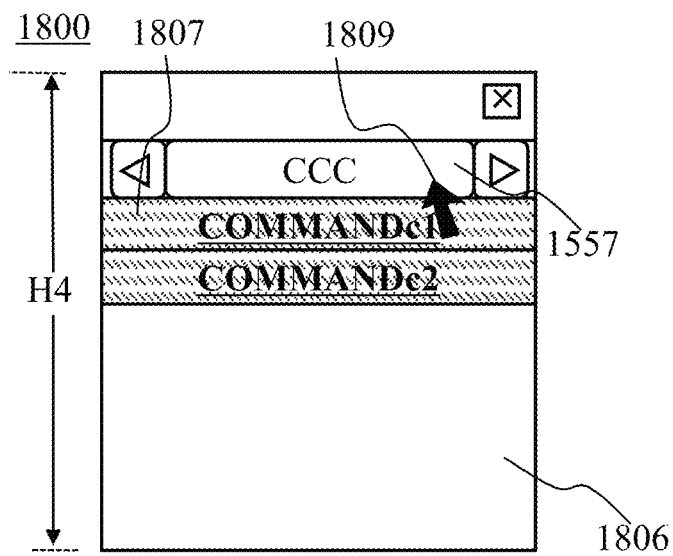
FIGS. 8A and 8B are diagrams illustrating an example where a command layer is displayed in a pull-down fashion in a case where the width and height of the window in embodiment 1 have been reduced.
Figure 8B:
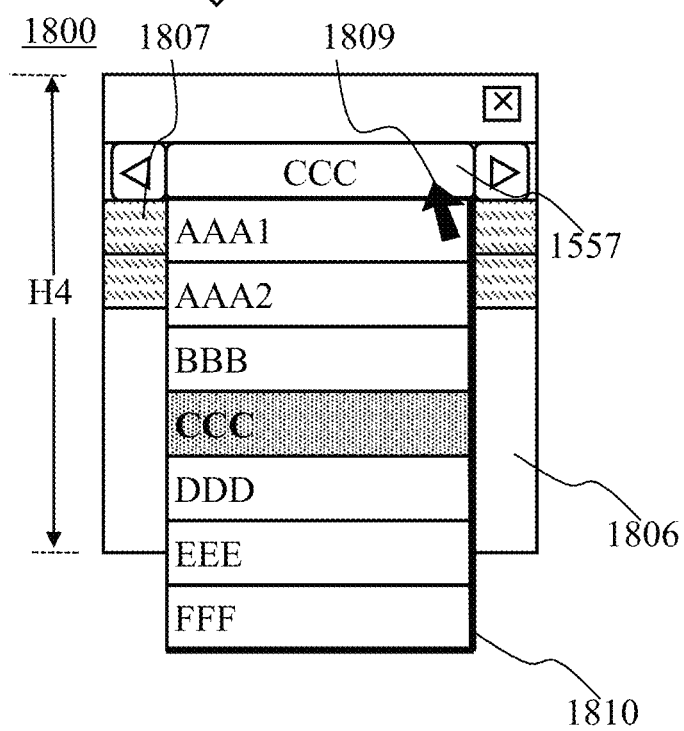

FIGS. 8A and 8B are diagrams illustrating an example where a command layer is displayed in a pull-down fashion in a case where the width and height of the window in embodiment 1 have been reduced.

In FIG. 8A, in a window 1800 having a height H4 and also a small width, the layer-2 commands under the command category CCC are displayed in a command list 1806 with plenty of free room.

However, as illustrated in FIGS. 6A to 6D and 7A to 7C, not all of the layer-2 commands under the command category AAA can be displayed in the window 1800 with the height H4.

For this reason, in FIG. 8B, the sub command category AAA1 and the sub command category AAA2 may be displayed in a pull-down menu 1810 according to the height H4.

In FIG. 8B, the pull-down menu 1810 sticks out from the bottom of the window 1800. In this case, in order to prevent the pull-down menu 1810 from sticking out from the bottom of the window 1800, a slide bar (e.g., the slide bar (1622, 1623, 1624) in FIG. 6C) may be displayed so as to keep the vertical length of the pull-down menu 1810 from becoming larger than the vertical length of the window 1800.

Figure 9A:
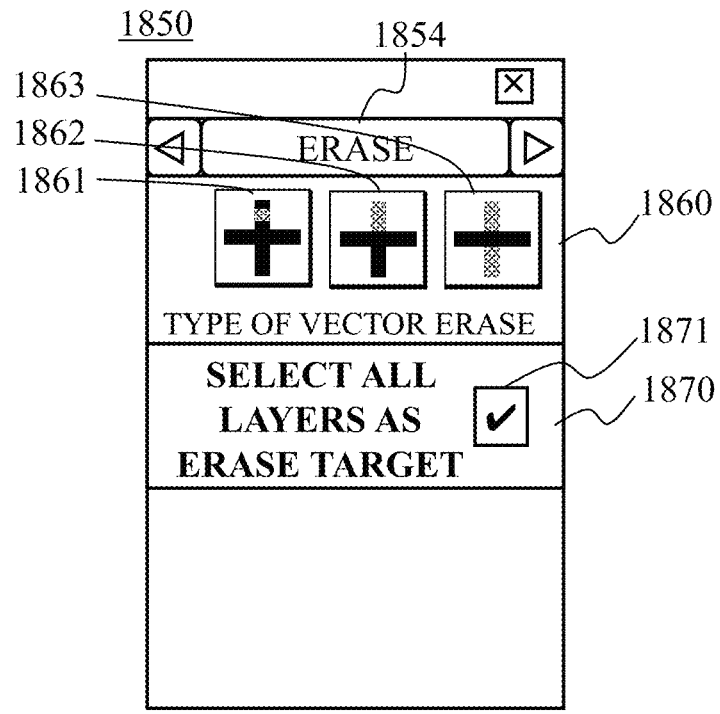
FIGS. 9A and 9B are diagrams illustrating an example where specific commands in embodiment 1 are displayed.
Figure 9B:
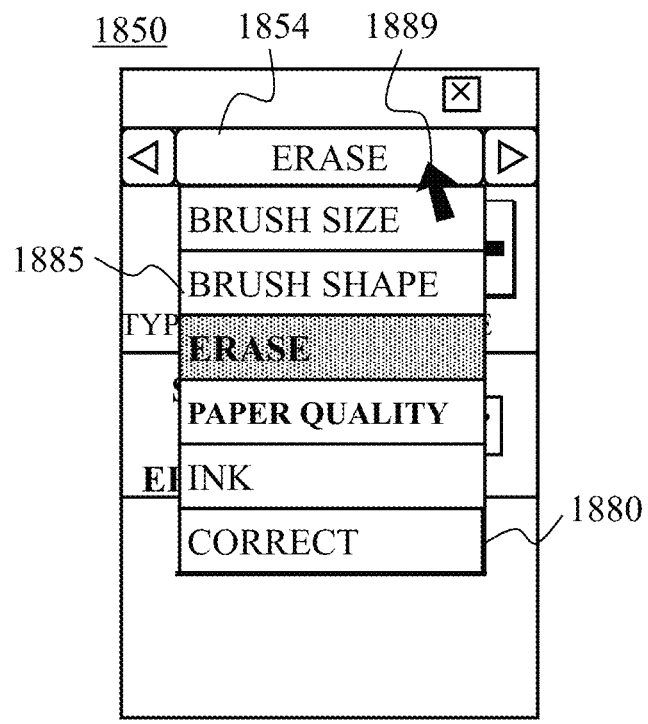

FIGS. 9A and 9B illustrating an example where specific commands in embodiment 1 are displayed. In a window 1850 in FIG. 9A, the command category is "Erase", and two commands of "Type of vector erase" 1860 and "Select all layers as erase target" 1870 are displayed. In the "Type of vector erase" 1860 are displayed three buttons of partial vector erase button 1861, a vector erase button 1862 for erasing up to an intersection point, and an erase button 1863 for erasing an entire vector. These three buttons are three buttons one of which can be turned on by clicking it with a mouse or doing the like. For example, which one of the three buttons is on may be made recognizable to the operator by a method such as highlighting the button that is on.

For example, in the case where the partial vector erase button 1861 is on, that button is highlighted. In this case, touching a line drawn by vector data by using an eraser tool, for example, on a drawing canvas erases only the touched portion of the line. Also, in the case where the vector erase button 1862 for erasing up to an intersection point is selected, then, touching a line drawn by vector data with the eraser tool, for example, erases the line in the vector data up to an intersection point with a line of other vector data. Also, in the case where the erase button 1863 for erasing an entire vector is selected, then, touching a line drawn by vector data with the eraser tool, for example, erases the entire line of the vector data.

In the "Select all layers as erase target" 1870, a check box 1871 can be checked or unchecked by clicking it with a mouse, for example. When the check box 1871 is checked, all layers are the erase target. When the check box 1871 is not checked, only the image of the currently active layer is the erase target.

FIG. 9B is a diagram illustrating a state where a portion 1854 displayed as "Erase" is clicked with a mouse cursor 1889, for example. In this case, a command category pull-down menu 1880 is displayed. It can be seen that the command category "Erase" in the pull-down menu 1880 is highlighted.

Figure 10:
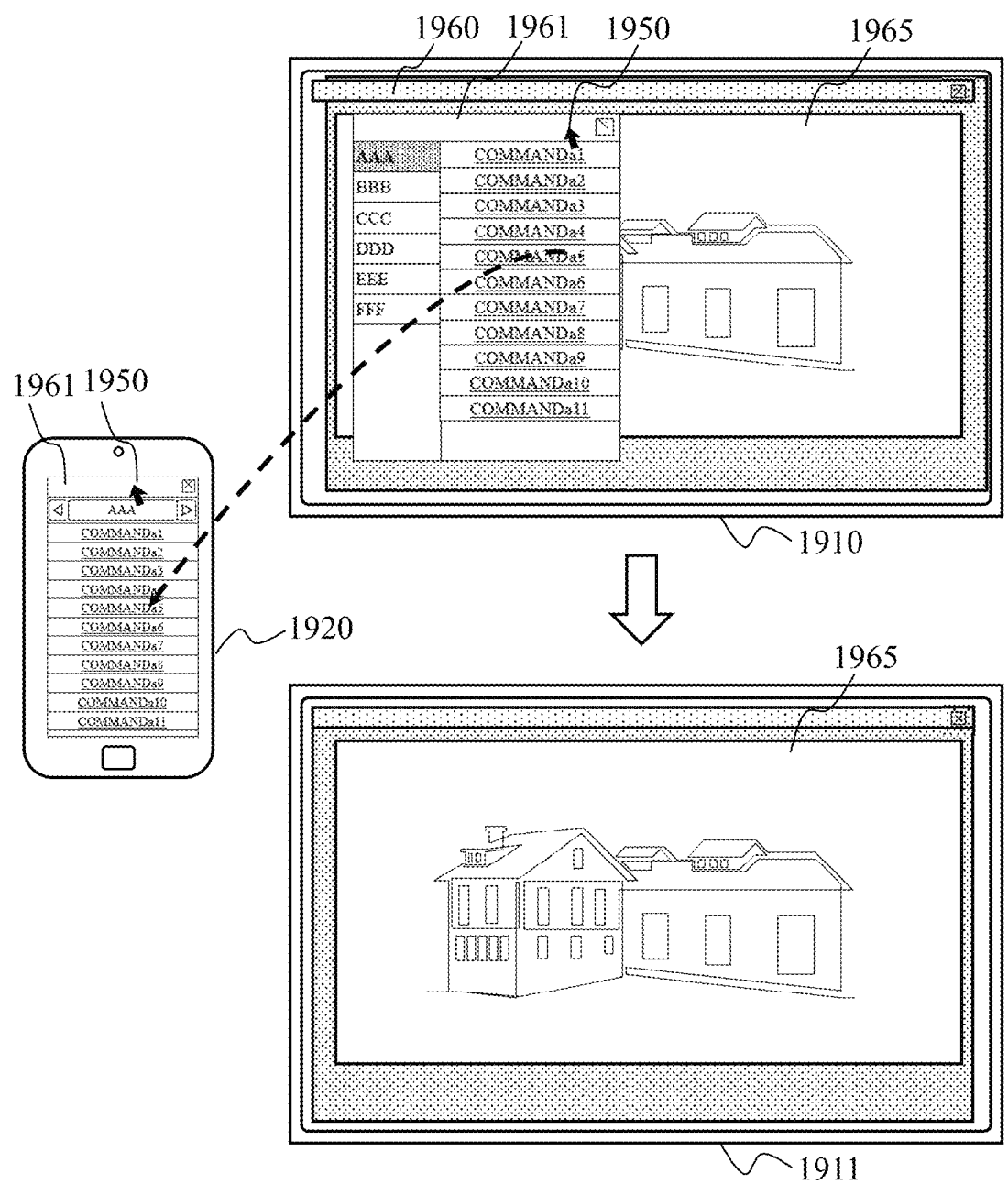
FIG. 10 is a diagram illustrating a display example of a window obtained by moving the window in embodiment 1 to another display apparatus.

FIG. 10 is a diagram illustrating a display example of a window obtained by moving the window in embodiment 1 to another display apparatus. On a main display 1910, a work area 1965 is displayed in an application window 1960. Further, a command window 1961 is displayed, which makes it difficult to view the work area 1965.

A mobile terminal 1920 functions as a sub display for the main display 1910. In the state illustrated, the operator has dragged the command window 1961 with a mouse cursor 1950 and dropped the command window 1961 in the display of the mobile terminal 1920 to move the command window 1961 to the mobile terminal.

The width of the display area of the mobile terminal 1920 is narrower than that of the main display 1910. Accordingly, the command window 1961 is displayed with a smaller display width. It is desirable to adjust the display form of the command window 1961 as appropriate according to the hardware shape of the display apparatus (display environment) as described above. In this case, although the display form changes according to the width of the mobile terminal 1920, the display of the lowest-layer (layer-2) level commands is maintained before and after the change in the display form. The operator can therefore continue the work without having to do unnecessary work such as following layers to search for a lowest-level layer command.

Moreover, as illustrated in a main display 1911 in FIG. 10, the command window no longer blocks the display of the work area 1965 displayed on the main display 1911. In this way, it is possible to make the commands easy to use for the operator, and also secure a sufficient work area for the application.

Embodiment 2

Figure 11:
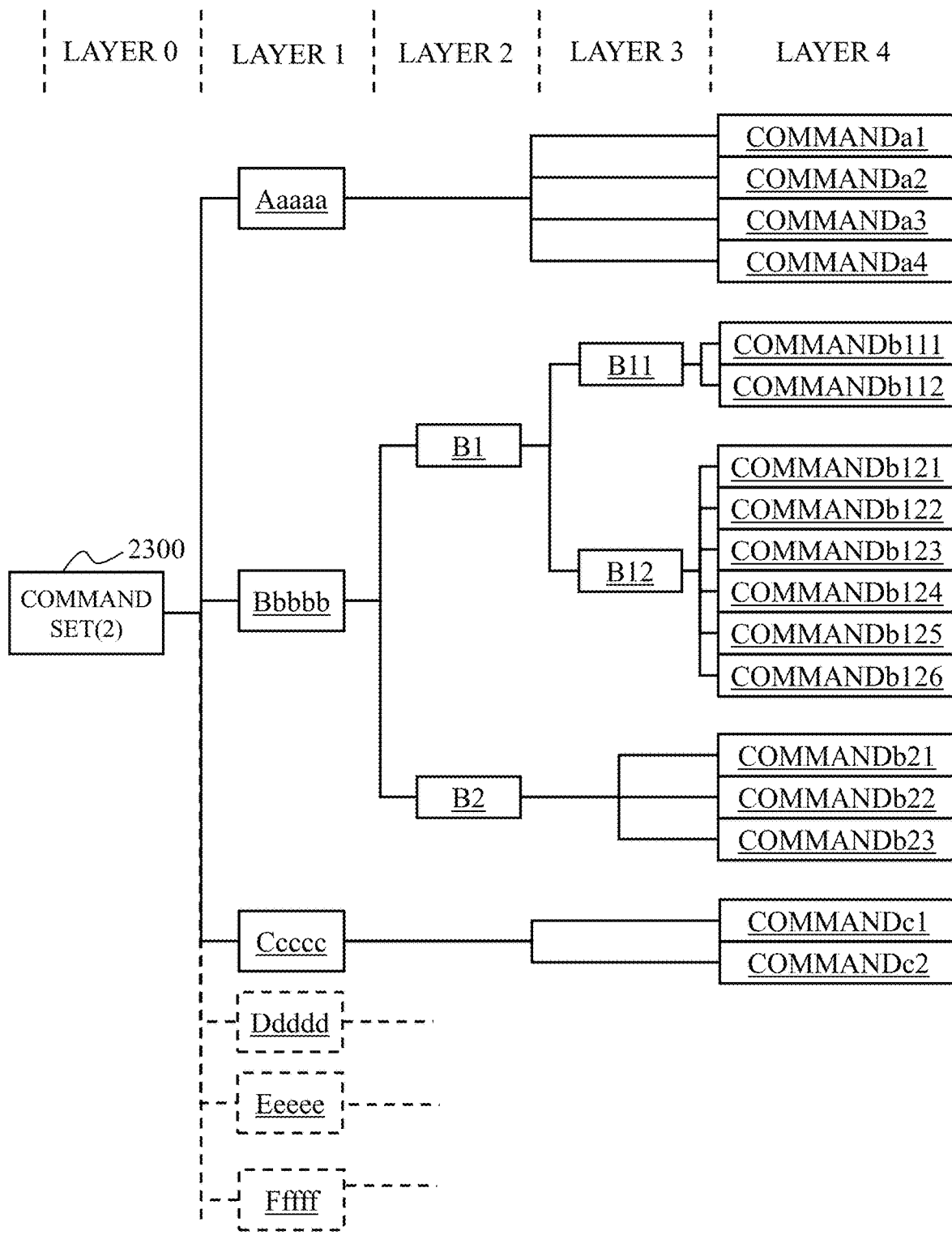
FIG. 11 is a diagram illustrating an example of the hierarchical structure of commands used in embodiment 2.

FIG. 11 is a diagram illustrating an example of the hierarchical structure of a command set (2) 2300 used in embodiment 2. The commands in the command set (2) 2300 can be classified by common concepts or character strings having a hierarchical structure. The layer depth in this hierarchical structure varies by the command type. The layers 0 to 3 represent command categories. Specific commands are listed in a lowest-level layer 4. A layer assigned a smaller number represents command categories of a higher-level concept. Note that the hierarchical structure in FIG. 11 is an example. A specific application program forms a unique hierarchical structure. In FIG. 11, command categories Aaaaa, Bbbbb, and Ccccc in the layer 1 are specifically illustrated down to the lower-level layers. It is to be noted that illustration of the hierarchical structure of command categories Ddddd, Eeeee, and Fffff depicted by the dotted lines is omitted for the purpose of making the following description simple and easy to understand.

Figure 12A:
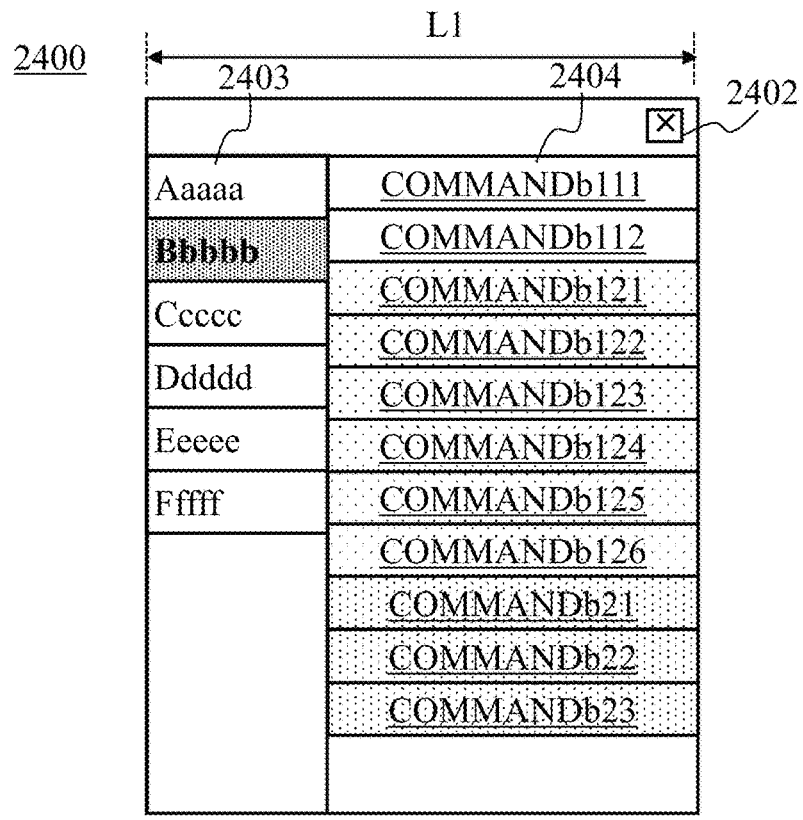
FIGS. 12A and 12B are diagrams illustrating an example of a case where the width of a window in embodiment 2 is changed.
Figure 12B:
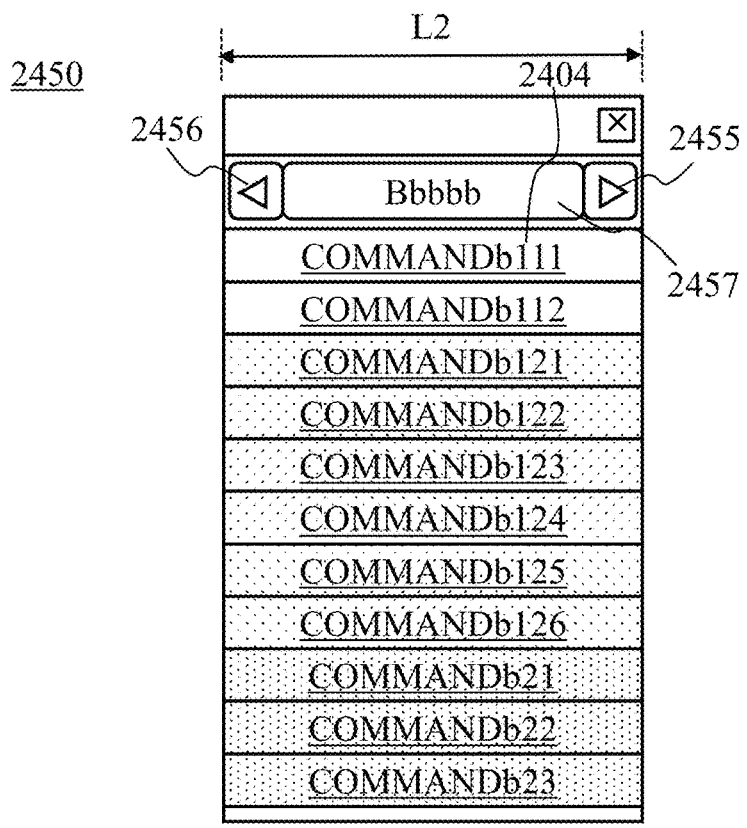

FIGS. 12A and 12B are diagrams illustrating an example of a case where the width of the window in embodiment 2 is changed. The horizontal width of a window 2400 in FIG. 12A is L1. In the window 2400, the layer-1 level command categories are listed and displayed in a menu 2403. The command category Bbbbb in the menu 2403 is highlighted. Further, the layer-4 level commands belonging to the command category Bbbbb are listed in a command list 2404. By operating one of the commands displayed in the command list 2404 with a pointing device, such as a mouse or a stylus pen, the operator can issue a desired command to the program. Note that the commands are not limited to commands that can be designated by being clicked, but may be any commands such as commands whose values can be set with a slide bar or the like or commands whose ON/OFF can be set with a toggle. Note that a symbol 2402 is a button capable of issuing an instruction to close the window 2400.

A window 2450 in FIG. 12B represents a window obtained by reducing the width L1 of the window 2400 to L2. In the case where the width of the window 2450 is thus reduced to L2, it is difficult to display both the command category menu 2403 and the command list 2404 displayed in the window 2400. Equally reducing the widths of both the menu 2403 and the command list 2404 makes it difficult to display both. Thus, displaying both the menu 2403 and the command list 2404 with reduced display widths will result in a GUI that is difficult to understand for the user. For this reason, the display of the command category menu 2403 is removed in the window 2450. Instead, a pull-down menu button 2457 which displays a pull-down menu or switch keys (2455, 2456) which, by being clicked, enables a command category display to be selected in a round-robin fashion may be displayed. In the present embodiment, these display forms and similar display forms will be collectively referred to as "a menu in a form in which a plurality of states switch from one to another in turn".

In FIG. 12B, it is desirable that the command list 2404 of the lowest-level layer 4 be displayed as is although the window 2450 is narrowed to the width L2. Displaying the command list 2404 of the lowest-level layer 4 in this manner enables the operator to perform a command operation more easily. By preventing the display of the command list 2404 from disappearing, it is possible to avoid forcing the operator to perform a troublesome operation of displaying the layer-4 commands again.

Figure 13A:
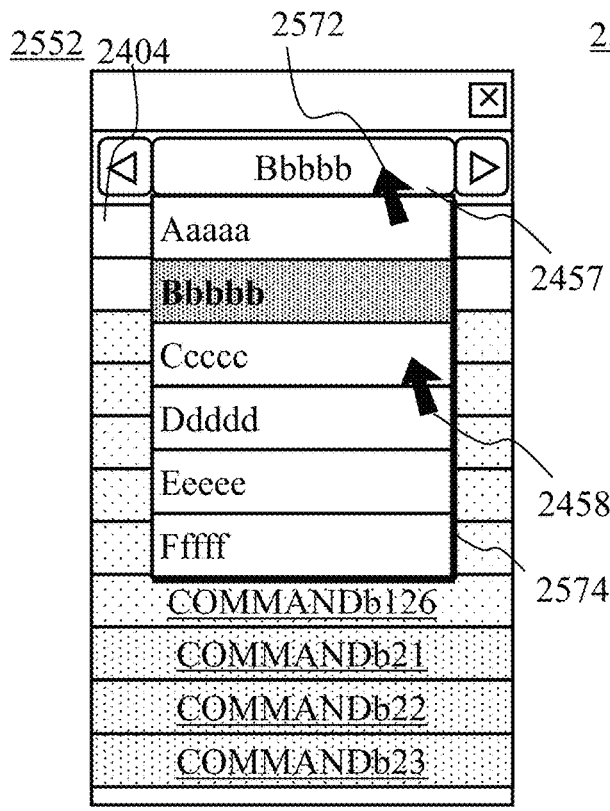
FIGS. 13A to 13C are diagrams illustrating an example of the behavior of the GUI when the width of the window in embodiment 2 is reduced.
Figure 13B:
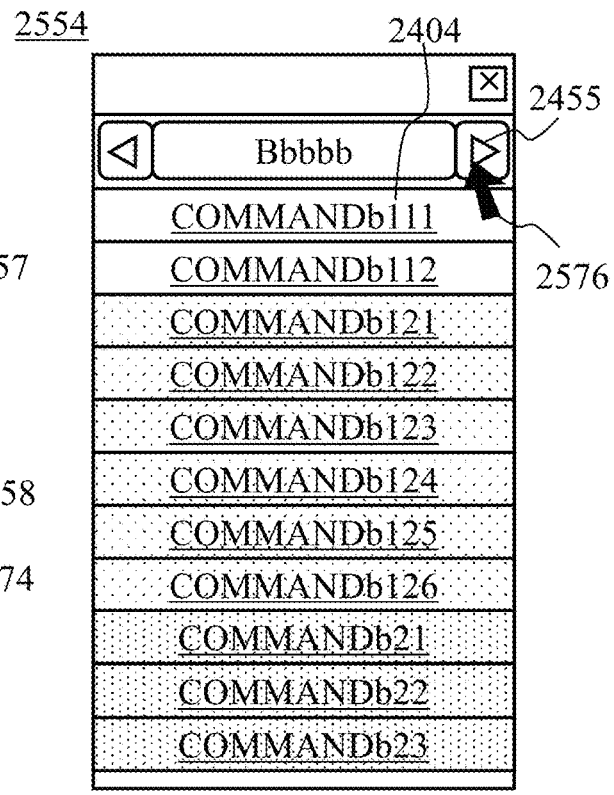
Figure 13C:
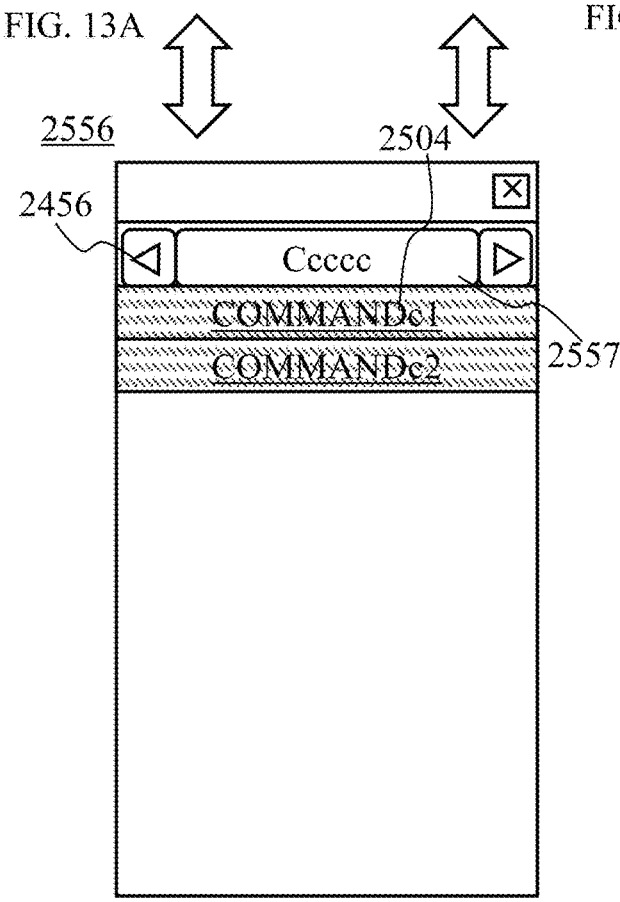

FIGS. 13A to 13C are diagrams illustrating an example of the behavior of the GUI when the width of the window in embodiment 2 is reduced. A window 2552 in FIG. 13A indicates a state where the pull-down menu button 2457 has been clicked with a mouse cursor 2572. The layer-1 level command categories are displayed in a pull-down menu 2574. The command category Bbbbb is highlighted since the layer-4 level commands under the command category Bbbbb are displayed in the window 2552. Assume that the command category Ccccc is clicked with a mouse cursor 2458 in this state.

FIG. 13C illustrates the state of a window 2556 immediately after that. A list 2504 of the layer-4 level commands under the command category Ccccc is displayed in the window 2556. By displaying the pull-down menu again in the window 2556 in FIG. 13C and selecting the command category Bbbbb, the window 2556 is brought back the state of the window 2552 in FIG. 13A.

FIG. 13B illustrates the state of a window 2554 immediately before the switch key 2455 is clicked with a mouse cursor 2576. Clicking the switch key 2455 with the mouse cursor 2576 displays the command category Ccccc in a pull-down menu button 2557, so that the window transitions to the state of the window 2556 in FIG. 13C. Clicking the switch key 2456 in the window 2556 in FIG. 13C brings the window back to the state of the window 2554 in FIG. 13B.

As described above, in FIGS. 13A to 13C, the width of the window 2552 has been reduced, but the operator can easily display desired layer-4 level commands by using the pull-down menu 2574 or the switch key 2455 or 2456.

FIGS. 14A to 14C are diagrams illustrating an example of a case where the height of the window in embodiment 2 is changed. In FIG. 14A, the height of the window 2400 is H1. In FIG. 14B, the height of a window 2601 has been reduced to H2. This results in a state where not all of the layer-4 commands under the command category Bbbbb can be displayed.

In this case, in the display of a menu 2603, command categories B1 and B2 obtained by dividing the display of the command category Bbbbb may be displayed. Further, in a command list 2604, the layer-4 level commands belonging to the command category B1 may be displayed, and the display of the layer-4 level commands belonging to the command category B2 may be removed. In this case, in the menu 2603, the command category B1 may be highlighted to notify the operator that the display of the command list 2604 indicates the layer-4 commands under the command category B1. Also, for example, the command category Ccccc or the like may be divided at the same time as when the display of the command category Bbbbb is divided, or they may be divided separately.

Further, in the display of the menu 2603, the command categories B1 and B2 obtained by dividing the display of the command category Bbbbb may be displayed as the layer 2 as sub command categories.

In FIG. 14C, the height of a window 2602 has been further reduced to H3. This results in a state where not all of the layer-4 level commands under the command category B1 can be displayed in a command list 2614. In this case, the constituent elements of the command category B1 may further be divided. Specifically, instead of the command category B1, command categories B11 and B12 may be displayed in a menu 2613 along with the command category B2. Further, the command category B11 may be displayed highlighted. In this state, the layer-4 level commands under the command category B11 are displayed in the command list 2614. Note that instead of the command category B11, the command category B12 may be highlighted, and the layer-4 level commands under the command category B12 may be displayed in the command list 2614. Which one of the command categories is to be displayed with priority may be determined in advance.

As described above, when the vertical length of the window is reduced such that the menu cannot display all command categories, the layer level of a command category displayed in the menu is shifted to a lower level as appropriate to thereby display a more detailed layer. In this way, it is possible to reduce the number of lowest-layer (layer-4) level commands displayed. The operator can view the menu in which the layer level varies according to the size of the window. Also, although the window is smaller, the operator can select an appropriate command category such that no command is hidden and becomes invisible and desired commands are displayed. Thus, a command display that is easy to understand and easy to select for the operator is possible.

Meanwhile, FIG. 14C illustrates an example where the menu 2613 has become unable to display all command categories. In this case, a slide bar (2622, 2623, 2624) may be displayed in the menu to enable the operator to issue an instruction to display a desired part of the menu.

Note that if the height of the window 2602 is increased from the state of FIG. 14C, the display form can be brought back to that of the window 2601 in FIG. 14B or the window 2400 in FIG. 14A according to this height.

In the above-described manner, an appropriate number of lowest-level layer (layer-4) commands can be displayed in an easily viewable fashion according to the height of the window. Note that when there is no lower-layer command category, a slide bar similar to the slide bar (2622, 2623, 2624) may be displayed in the command list 2614 or the like.

FIGS. 15A to 15C are diagrams illustrating a display example of the hierarchical structure of commands in a case where the height of the window in embodiment 2 is changed.

FIGS. 15A to 15C illustrate an example of a case where a different command category, with respect to the height of the window described with reference to FIGS. 14A to 14C, is selected.

In FIG. 15A, the command category Ccccc is selected and highlighted in a menu 2703. In this case, the layer-4 level commands belonging to the command category Ccccc are displayed in a command list 2704.

In the case of the window 2601 in FIG. 15B, the layer-4 level commands under the command category Ccccc are displayed in the command list 2704 with plenty of free room. For the command category Bbbbb, however, the height of the command list 2704 is small, as described with reference to FIGS. 14A to 14C. Thus, in a menu 2713, the layer-2 level command categories B1 and B2 may be displayed.

The same applies to FIG. 15C. In a menu 2723, layer-3 level command categories B11 and B12 and the layer-2 level command category B2 may be displayed according to the height of the command list 2704 in a window 2602 in FIG. 15C. Also, as in FIG. 13C, a slide bar similar to the slide bar (2622, 2623, 2624) may be displayed in the menu 2723.

Figure 16A:
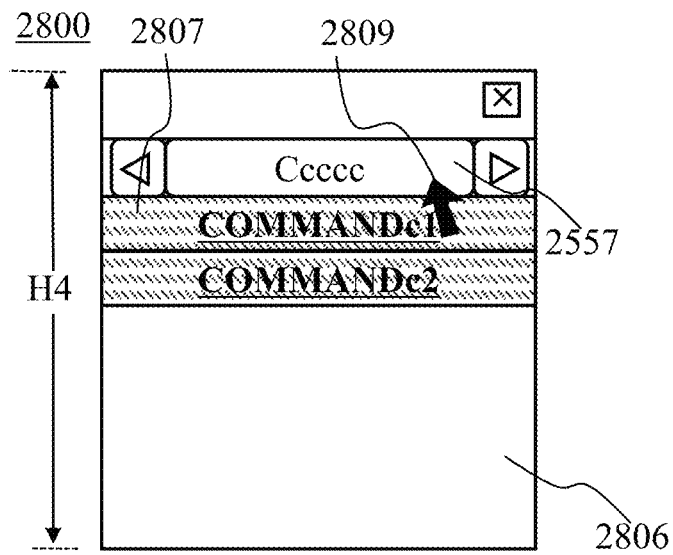
FIGS. 16A and 16B are diagrams illustrating an example where a command layer is displayed in a pull-down fashion in a case where the width and height of the window in embodiment 2 have been reduced.
Figure 16B:
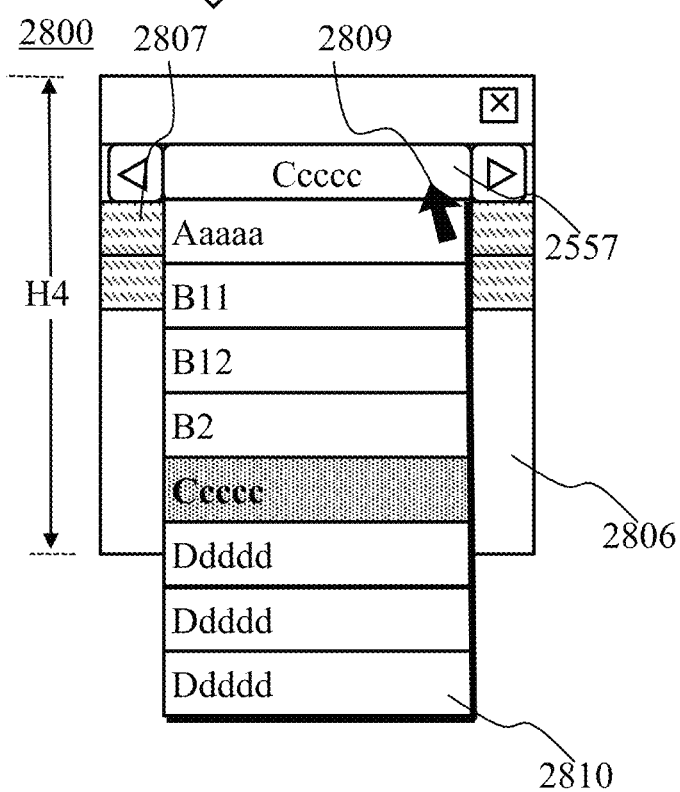

FIGS. 16A and 16B are diagrams illustrating an example where a command layer is displayed in a pull-down fashion in a case where the width and height of the window in embodiment 2 have been reduced.

In FIGS. 16A and 16B, in a window 2800 having a height H4 and also a small width, the layer-4 commands under the command category Ccccc are displayed in a command list 2806 with plenty of free room.

However, as illustrated in FIGS. 14A to 14C and 15A to 15C, not all of the layer-4 commands under the command category Bbbbb can be displayed in the window 2800 with the height H4.

For this reason, in FIG. 16B, the layer-3 command categories B11 and B12 and the layer-2 command category B2 may be displayed in a pull-down menu 2810 according to the height H4.

In FIG. 16B, the pull-down menu 2810 sticks out from the bottom of the window 2800. In this case, in order to prevent the pull-down menu 2810 from sticking out from the bottom of the window 2800, a slide bar (e.g., the slide bar (2622, 2623, 2624) in FIG. 14C) may be displayed so as to keep the vertical length of the pull-down menu 2810 from becoming larger than the vertical length of the window 2800.

Figure 17A:
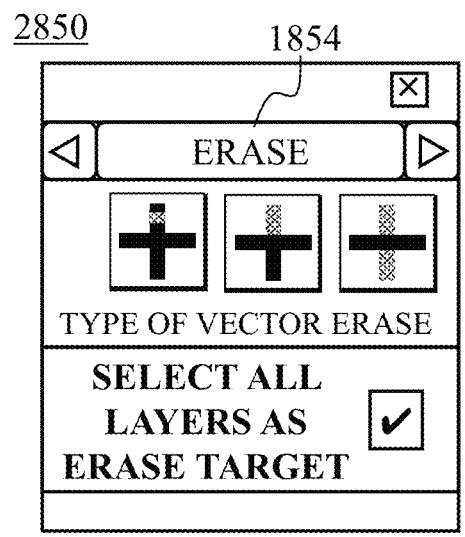
FIGS. 17A and 17B are diagrams illustrating an example where specific commands in embodiment 2 are displayed.
Figure 17B:
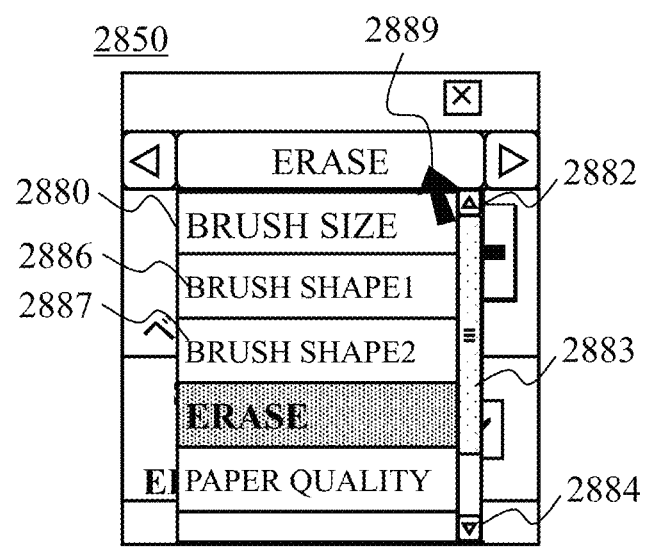

FIGS. 17A and 17B are diagrams illustrating an example where specific commands in embodiment 2 are displayed. Commands similar to those in FIGS. 9A and 9B are displayed in a window 2850 in FIGS. 17A and 17B. Note that FIGS. 9A, 9B, 17A and 17B differ in that the vertical length of the window 2850 in FIGS. 17A and 17B is smaller than that of the window 1850 in FIGS. 9A and 9B.

In FIG. 17A, two command are displayed in the window 2850, as in FIGS. 9A and 9B.

FIG. 17B is a diagram illustrating a state where the portion 1854 displayed as "Erase" is clicked with a mouse cursor 2889, for example. In this case, a command category pull-down menu 2880 is displayed. Since the vertical length of the window 2850 in FIGS. 17A and 17B is smaller than that of the window in FIGS. 9A and 9B, a slide bar (2882, 2883, 2884) is displayed in the pull-down menu 2880. The pull-down menu 2880 may be kept from sticking out from the window 2850 in this manner.

Also, since the vertical length of the window 2850 in FIGS. 17A and 17B is smaller than that of the window in FIGS. 9A and 9B, "Brush shape 1" 2886 and "Brush shape 2" 2887 being lower-level command categories than a command category "Brush shape" 1885 in FIGS. 9A and 9B may be displayed in the pull-down menu 2880.

Figure 18:
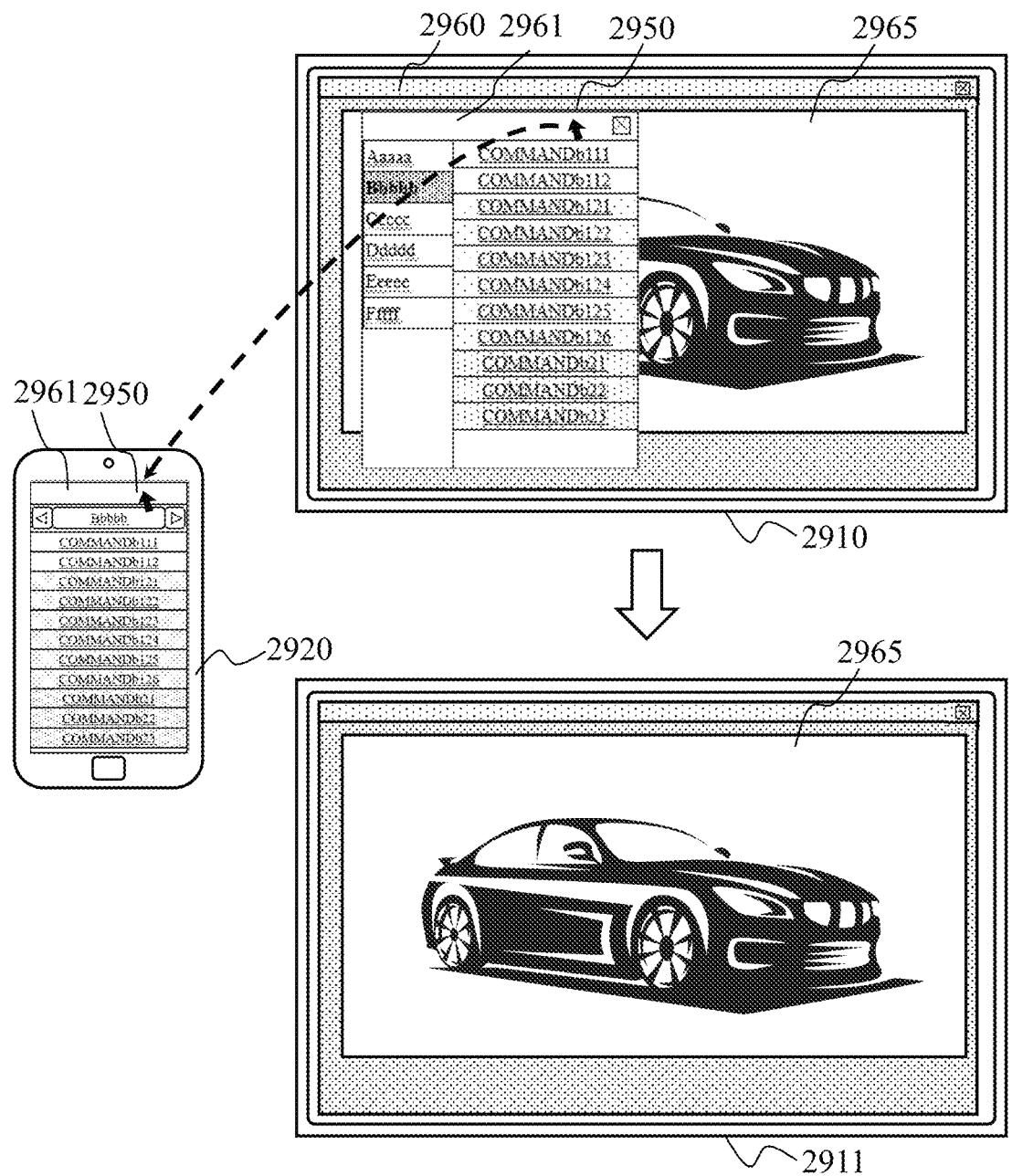
FIG. 18 is a diagram illustrating a display example of a window obtained by moving the window in embodiment 2 to another display apparatus.

FIG. 18 is a diagram illustrating a display example of a window obtained by moving the window in embodiment 2 to another display apparatus. On a main display 2910, a work area 2965 is displayed in an application window 2960. Further, a command window 2961 is displayed, which makes it difficult to view the work area 2965.

A mobile terminal 2920 functions as a sub display for the main display 2910. In the state illustrated, the operator has dragged the command window 2961 with a mouse cursor 2950 and dropped the command window 2961 in the display of the mobile terminal 2920 to move the command window 2961 to the mobile terminal.

The width of the display area of the mobile terminal 2920 is narrower than that of the main display 2910. Accordingly, the command window 2961 is displayed with a smaller display width. It is desirable to adjust the display form of the command window 2961 as appropriate according to the hardware shape of the display apparatus (display environment) as described above. In this case, although the display form changes according to the width of the mobile terminal 2920, the display of the lowest-layer (layer-4) level commands is maintained before and after the change in the display form. The operator can therefore continue the work without having to do unnecessary work such as following layers to search for a lowest-level layer command.

Moreover, as illustrated in a main display 2911 in FIG. 18, the command window no longer blocks the display of the work area 2965 displayed on the main display 2911. In this way, it is possible to make the commands easy to use for the operator, and also secure a sufficient work area for the application.

<Processing Flow>

A flow of the above-described processing will be described below using flowcharts.

Figure 19:
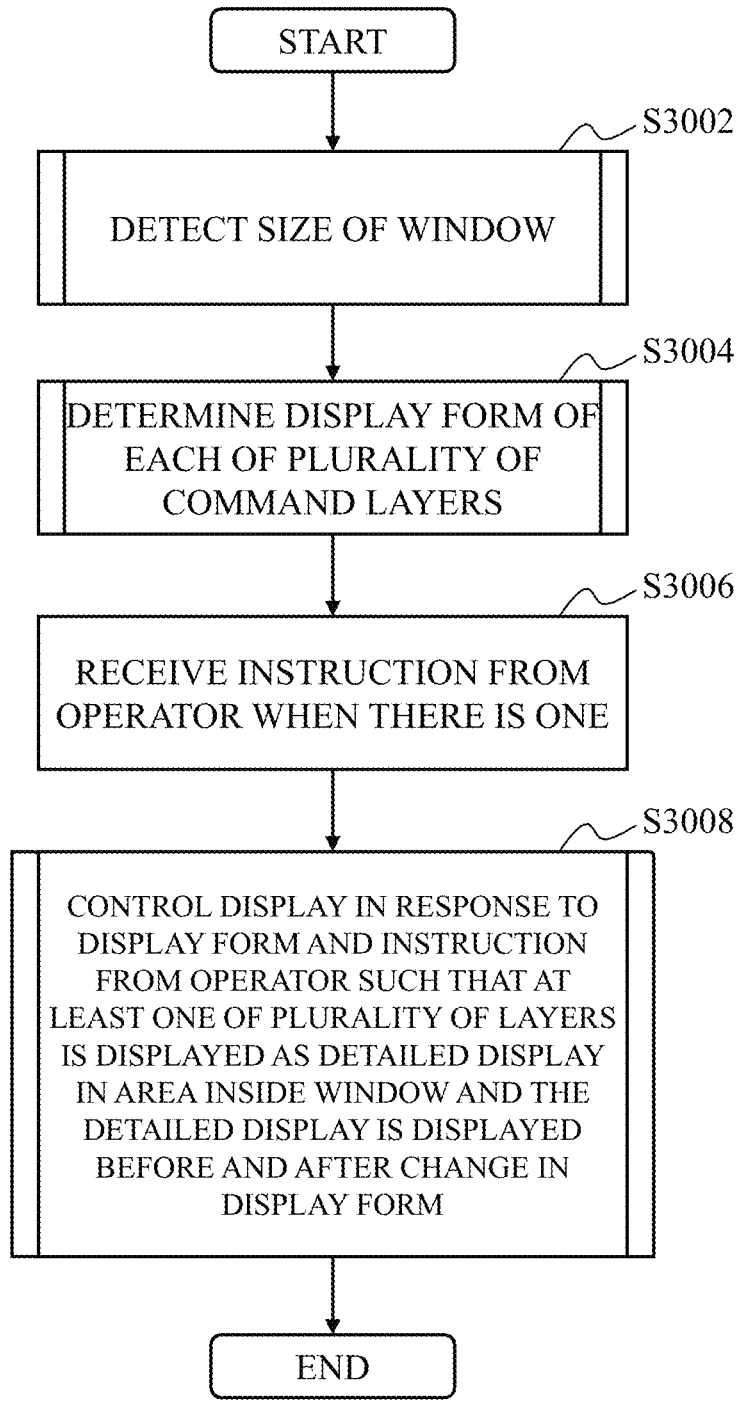
FIG. 19 is a diagram illustrating an outline of procedures in embodiments 1 and 2.

FIG. 19 is a diagram illustrating an outline of the procedures in embodiments 1 and 2 described above.

In step S3002, the size of the window is detected.

In step S3004, the display form of each of the plurality of command layers is determined.

In step S3006, an instruction from the operator is received when there is one.

In step S3008, the display is controlled in response to the display form and the instruction from the operator such that at least one of the plurality of layers is displayed as a detailed display in an area inside the window and the detailed display is displayed before and after a change in the display form.

By the above processing, commands, for example, are displayed as a detailed display inside the window. Further, since the commands in this detailed display are displayed before and after a change in the display form, the operator can save the trouble of following layers and selecting a command again. Hence, the user-friendliness of commands is improved.

Figure 20:
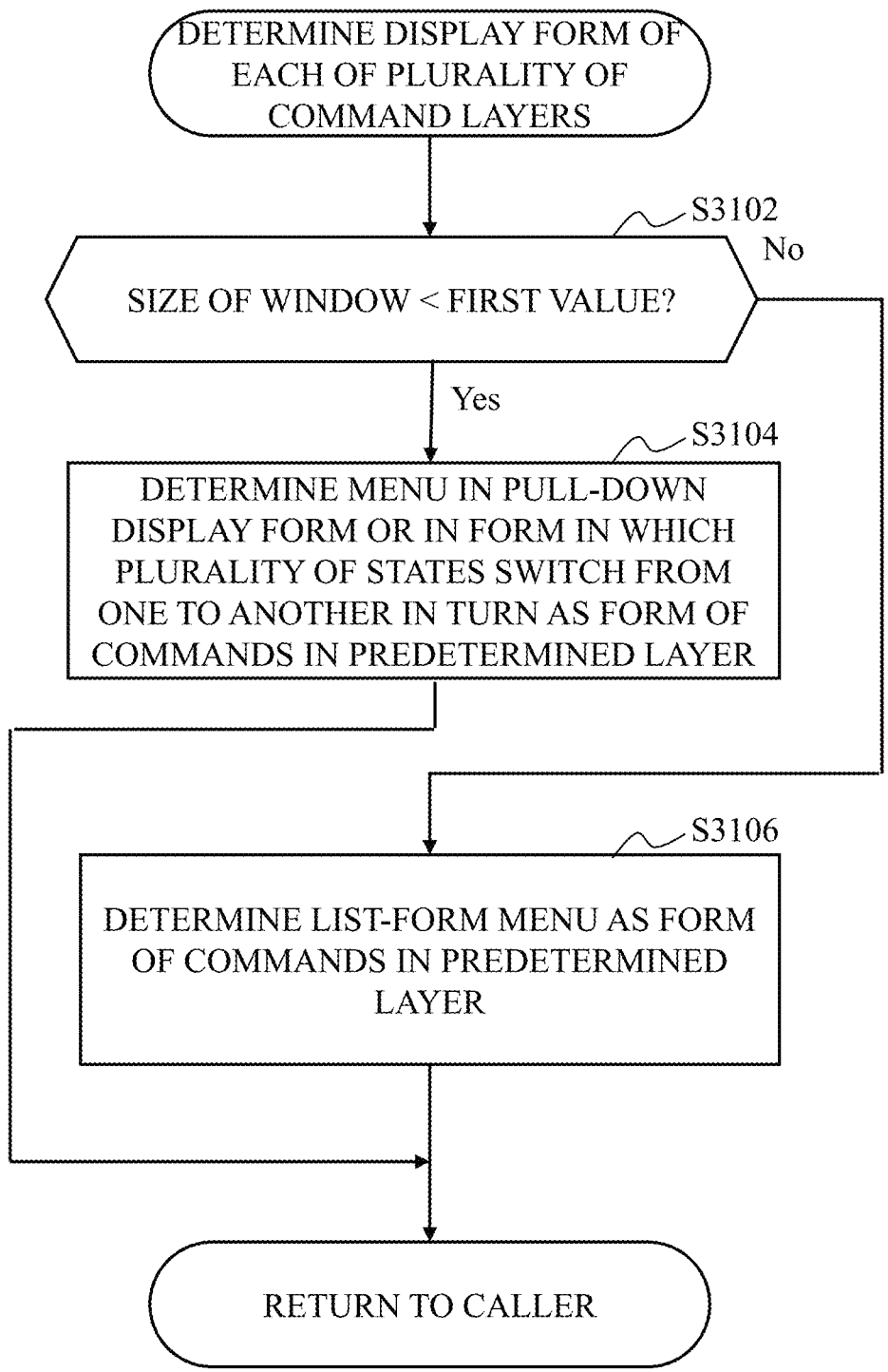
FIG. 20 is a diagram illustrating an example of a procedure of determining the display form in embodiments 1 and 2.

FIG. 20 is a diagram illustrating an example of a procedure of determining the display form. This processing is executed to determine the display form of each of a plurality of command layers.

In step S3102, whether the size of the window is smaller than a first value is checked. If the check results in YES, the processing proceeds to step S3104. If the check results in NO, the processing proceeds to step S3106.

In step S3104, the form of the commands in a predetermined layer is determined to be a menu in a pull-down display form or in a form in which a plurality of states switch from one to another in turn.

In step S3106, the form of the commands in the predetermined layer is determined to be a list-form menu.

By the above processing, a menu corresponding to the size of the window is selected.

Figure 21:
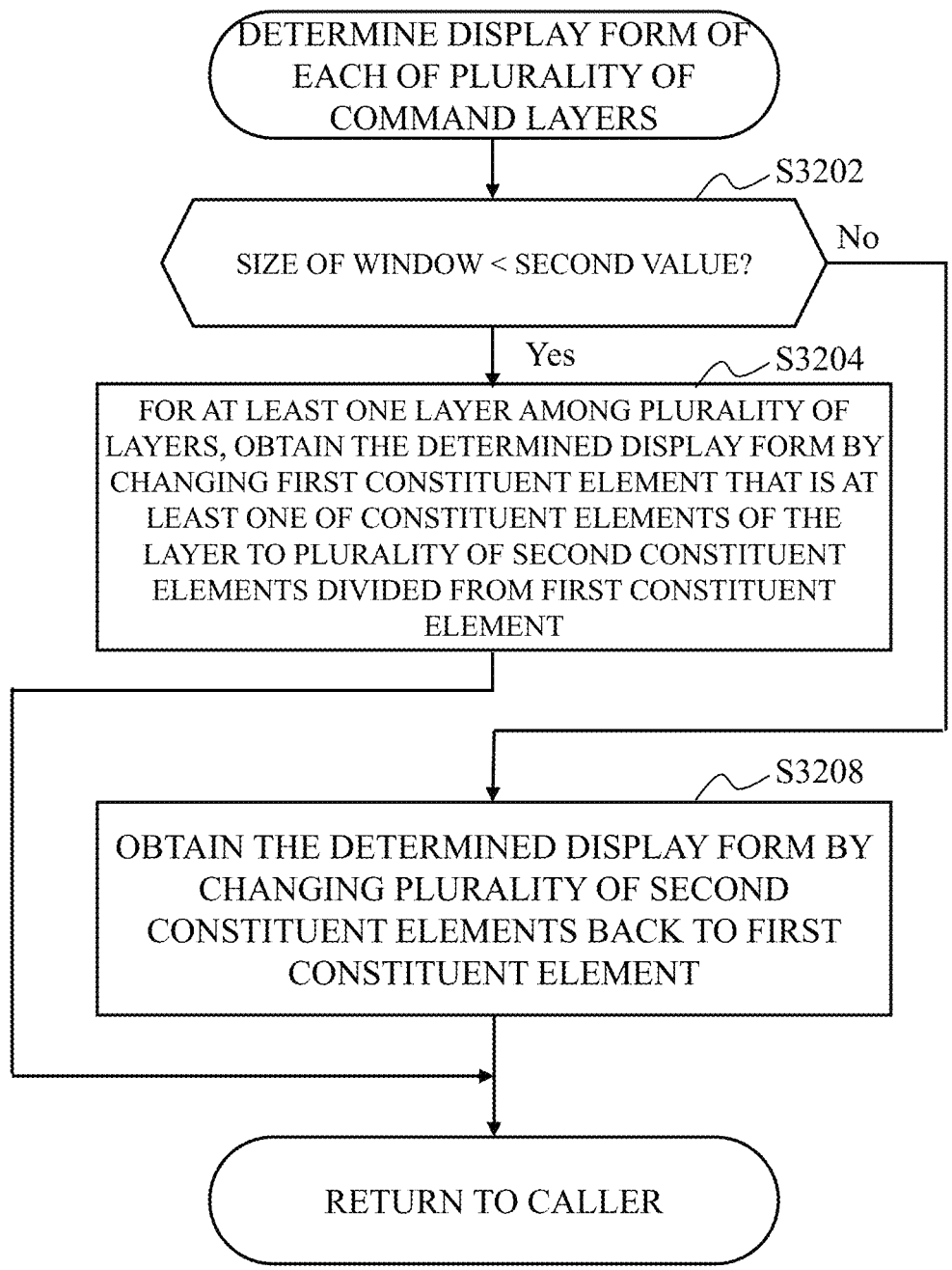
FIG. 21 is a diagram illustrating an example of another procedure of determining the display form in embodiments 1 and 2.

FIG. 21 is diagram illustrating an example of another procedure of determining the display form. This processing is executed to determine the display form of each of a plurality of command layers.

In step S3202, whether the size of the window is smaller than a second value is checked. If the check results in YES, the processing proceeds to step S3204. If the check results in NO, the processing proceeds to step S3208.

In step S3204, for at least one layer among the plurality of layers, the determined form is obtained by changing a first constituent element that is at least one of the constituent elements of the layer to a plurality of second constituent elements divided from the first constituent element.

In step S3208, the determined form is obtained by changing the plurality of second constituent elements back to the first constituent element.

By the above processing, the command layer can be selected in a suitable manner based on the size of the window, and the number of commands displayed in the menu is adjusted to the size of the window.

Figure 22:
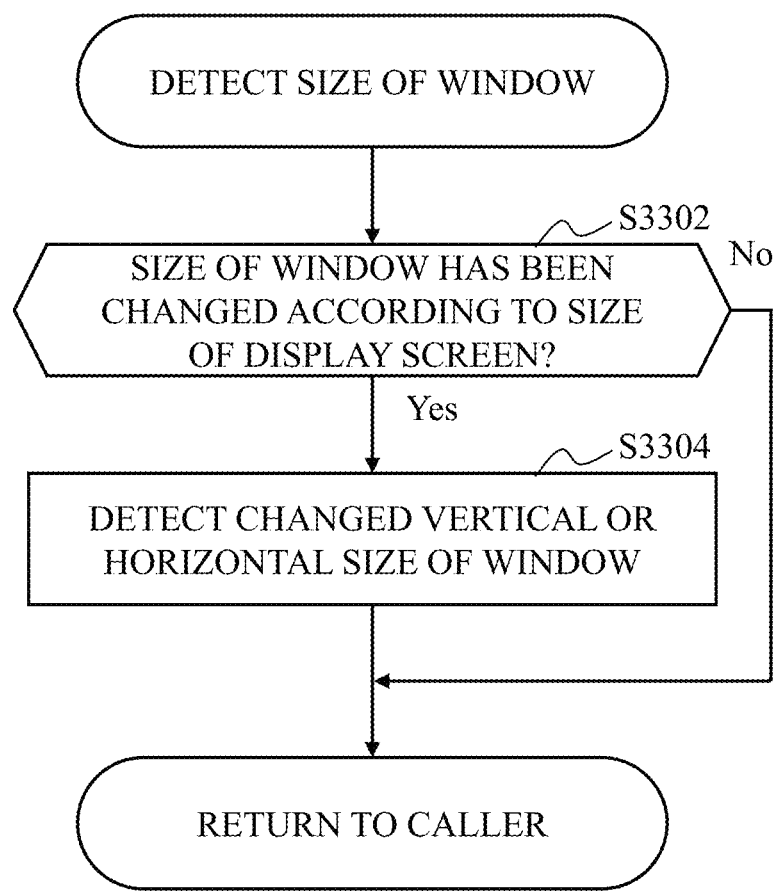
FIG. 22 is a diagram illustrating an example of a procedure of detecting the size of the window in embodiments 1 and 2.

FIG. 22 is a diagram illustrating an example of a procedure of detecting the size of the window.

In step S3302, whether the size of the window has been changed according to the size of a display screen is checked. If the check results in YES, the processing proceeds to step S3304. If the check results in NO, the processing returns to the caller.

In step S3304, the changed vertical or horizontal size of the window is detected.

By the above processing, the size of the window is detected based on the size of the display area on a display apparatus such as a display, and commands can be displayed in a suitable manner.

Figure 23:
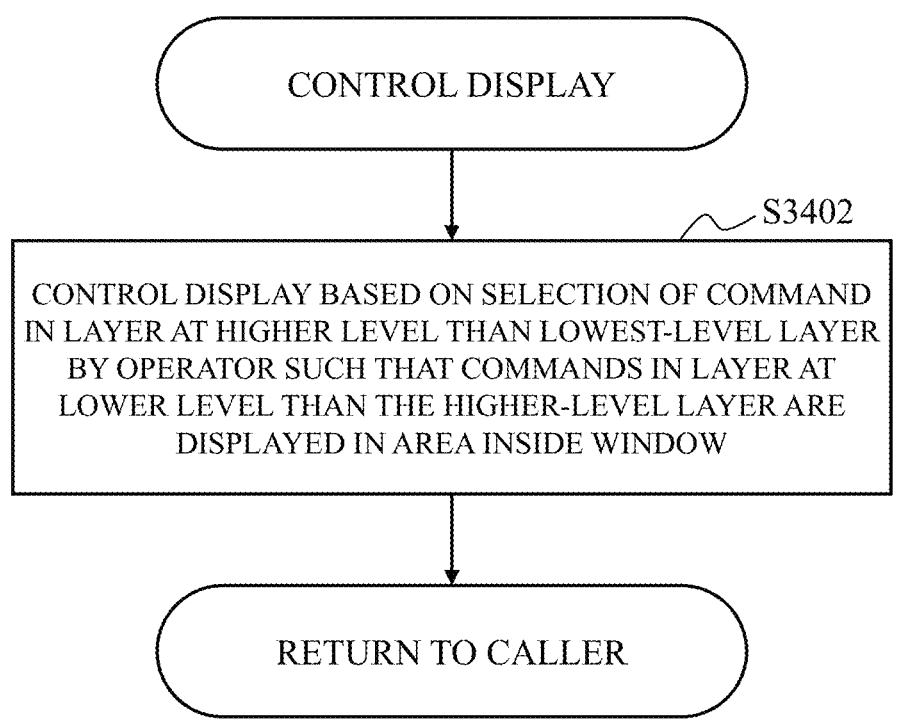
FIG. 23 is a diagram illustrating an example of a procedure of controlling the display in embodiments 1 and 2.

FIG. 23 is a diagram illustrating an example of a procedure of controlling the display.

In step S3402, the display is controlled based on selection of a command in the layer at a higher level than the lowest-level layer by the operator such that the commands in the layer at a lower level than the higher-level layer are displayed in an area inside the window.

This processing can ensure the display of the lowest-level layer commands. Since the lowest-level layer commands are commands with each of which the operator designates a specific process, it is desirable to keep these commands displayed.

Meanwhile, the size of the window can be in units of a physical length as well as in units of pixels.

While several embodiments of the invention were described in the foregoing detailed description, those skilled in the art may make modifications and alterations to these embodiments without departing from the scope and spirit of the invention. Accordingly, the foregoing description is intended to be illustrative rather than restrictive.

The invention claimed is:

1. A command display method being a method of displaying a plurality of commands in a computer including a graphical user interface for displaying the plurality of commands in a window on a display screen, the plurality of commands having a plurality of layers,
the command display method comprising:
detecting a vertical or horizontal size of the window;
determining, in response to the detected size, a form of a display of a menu from which a command in each of the plurality of layers is selected; and
controlling a display of the plurality of commands in each of the plurality of layers in response to the determined display form of the menu or an instruction from an operator such that
commands in a first layer among the plurality of layers are controlled to be displayed in a list in an area inside the window,
the first layer is a layer that is at a lower level among the plurality of layers than at least one layer whose display form of the menu changes, and
the list in the first layer is displayed before and after a change in the display form of the menu,
wherein in the determining of the form of the display of the menu, a form of the plurality of commands in the at least one layer at a higher level than the first layer is determined to be the display form of the menu in a pull-down display form and/or in a form in which a plurality of states switch from one to another in turn when the detected size is smaller than a first value, and the form of the plurality of commands in the at least one layer at the higher level is determined to be the display form of the menu in a list form when the detected size is larger than or equal to the first value, and
wherein in the controlling, when the detected size becomes smaller than the first value, the display in the list form of the plurality of commands in the at least one layer at the higher level is removed to give a space to the list in the first layer.

2. The command display method according to claim 1, wherein in the detecting, when the size of the window is changed according to the size of the display screen, a changed vertical or horizontal size of the window is detected.

3. The command display method according to claim 1, wherein in the detecting, the detection is performed using a pixel count as a unit.

4. The command display method according to claim 1, wherein in the controlling, based on selection of a command in a layer among the plurality of layers at a higher level than the lowest-level layer by the operator, a layer among the plurality of layers at a lower level than the higher-level layer is determined to be the first layer.

5. The command display method according to claim 1, wherein in the controlling, after the change in the display form of the menu, all of the list in the first layer is displayed.

6. A non-transitory computer-readable medium storing a program that causes a computer to execute the method according to claim 1.

7. A command display apparatus for displaying a plurality of commands in a computer including a graphical user interface for displaying the plurality of commands in a window on a display screen, the plurality of commands having a plurality of layers, the command display apparatus comprising:

a CPU; and at least one memory connected to the CPU and storing a program that causes the computer to execute a method comprising:

detecting a vertical or horizontal size of the window;

determining, in response to the detected size, a form of a display of a menu from which a command in each of the plurality of layers is selected; and controlling a display of the plurality of commands in each of the plurality of layers in response to the determined display form of the menu or an instruction from an operator such that commands in a first layer among the plurality of layers are controlled to be displayed in a list in an area inside the window, the first layer is a layer that is at a lower level among the plurality of layers than at least one layer whose display form of the menu changes, and the list in the first layer is displayed before and after a change in the display form of the menu, wherein in the determining of the form of the display of the menu, a form of the plurality of commands in the at least one layer at a higher level than the first layer is determined to be the display form of the menu in a pull-down display form and/or in a form in which a plurality of states switch from one to another in turn when the detected size is smaller than a first value, and the form of the plurality of commands in the at least one layer at the higher level is determined to be the display form of the menu in a list form when the detected size is larger than or equal to the first value, and wherein in the controlling, when the detected size becomes smaller than the first value, the display in the list form of the plurality of commands in the at least one layer at the higher level is removed to give a space to the list in the first layer.

* * * * *